(12) United States Patent  (10) Patent No.: US 8,103,533 B2
Leslie  (45) Date of Patent: Jan. 24, 2012

(54) AUTOMATED RESOURCE PLANNING TOOL AND USER INTERFACE

(75) Inventor: Christopher E. Leslie, Friendswood, TX (US)

(73) Assignee: United Space Alliance, LLC, Cape Canaveral, FL (US)

( * ) Notice: Subject to any disclaimer, the term of this patent is extended or adjusted under 35 U.S.C. 154(b) by 0 days.

(21) Appl. No.: 11/467,075

(22) Filed: Aug. 24, 2006

(65) Prior Publication Data

US 2007/0050225 A1  Mar. 1, 2007

Related U.S. Application Data

(60) Provisional application No. 60/711,414, filed on Aug. 26, 2005.

(51) Int. Cl.
*G06Q 10/00* (2006.01)

(52) U.S. Cl. ........................ 705/7.12; 705/7.11

(58) Field of Classification Search ............... 705/7.11, 705/7.12
See application file for complete search history.

(56) References Cited

U.S. PATENT DOCUMENTS

| | | | |
|---|---|---|---|
| 5,606,695 A | 2/1997 | Dworzecki | |
| 5,951,609 A * | 9/1999 | Hanson et al. | 701/13 |
| 6,122,572 A * | 9/2000 | Yavnai | 701/23 |
| 6,133,872 A * | 10/2000 | Mitchell et al. | 342/357.1 |
| 6,216,106 B1 * | 4/2001 | John | 704/270 |
| 6,216,109 B1 | 4/2001 | Zweben et al. | |
| 6,490,566 B1 * | 12/2002 | Schmidt | 705/8 |
| 6,606,529 B1 * | 8/2003 | Crowder et al. | 700/100 |
| 7,006,903 B2 | 2/2006 | Smith et al. | |
| 7,505,827 B1 * | 3/2009 | Boddy et al. | 700/100 |
| 2003/0050871 A1 * | 3/2003 | Broughton | 705/28 |
| 2003/0233178 A1 | 12/2003 | Sinex | |
| 2004/0162811 A1 | 8/2004 | Wetzer et al. | |
| 2006/0136103 A1 | 6/2006 | Lee et al. | |
| 2007/0021998 A1 | 1/2007 | Laithwaite et al. | |
| 2008/0017759 A1 * | 1/2008 | Fussell et al. | 244/171.3 |

FOREIGN PATENT DOCUMENTS

EP  1641218  3/2006

OTHER PUBLICATIONS

Refanidis et al, ICAPS 2005 System Demonstrations, Monterey, California, Jun. 6-10, 2005.*
Zeng et al, "Flexible access for a space communications network with IP functionality", Elsevier B.V., 1389-1286, 2004.*
Chien et al, "Automating Planning and Scheduling of Shuttle Payload Operations", Jet Propulsion Laboratory, California Institute of Technology, 1998.*
Hagopian et al, "Explicit and Implicit resources: A simplified approach to user requirements modeling", National Aeronautics and Space Administration, Paper ID No. SO96.3.8, 1996.*
Fukunaga et al. (Fukunaga), "Towards an Application Framework for Automated Planning and Scheduling", In Proceedings of IEEE Aerospace Conference, Snowmass, CO, 1997.*

(Continued)

*Primary Examiner* — Thomas L. Mansfield, Jr.
(74) *Attorney, Agent, or Firm* — Greenberg Traurig LLP

(57) ABSTRACT

An automated tool for scheduling tasks to be performed based on resources available in a constrained environment. The tool gives crew members, employees, or others responsible for the performance of tasks in the constrained environment the power to adjust task schedules to take projected conditions into account.

18 Claims, 21 Drawing Sheets

OTHER PUBLICATIONS

"STK/Scheduler" Orbit Logic; http://orbitlogic.com/products/stkscheduler.php; pp. 1-5.

"Satellite Tool Kit Scheduler"; http://orbitlogic.com/support/Scheduler/frame.htm; 4 pgs.

"STK/Scheduler Tutorial"; STK/Scheduler v8.0; http://orbitlogic.com/products/STKscheduler_Tutorial.pdf pp. 1-43.

"Optwise Corporation Deconfliction Scheduler Algorithms (As used in STK/Scheduler)"; Optwise Corporation; http://orbitlogic.com/products/Optwise%20Alog%20in%20STK%20Scheduler.pdf pp. 1-18; Jul. 15, 2004.

"Collection Planning Solutions from Orbit Logic: Key Aspects"; Orbit Logic; http://orbitlogic.com/products/cps.php; pp. 1-2.

"ICAPS 2005, System Demonstration," http://icaps05.uni-ulm.de/documents/proceedings/sd-allpapers.pdf, by Ioannis Refanidis, Univ. of Macedonia, Greece.

Notice of Intent to Propose (to NASA) by United Space Alliance, LLC, Apr. 2004.

Autonomy and Operations: Implementation Scenarios, by Cindy M. Kurt of United Space Alliance, LLC.

Firschein, Oscar et al., Artificial Intelligence for Space Station Automation—Crew Safety, Productivity, Autonomy, Augmented Capability, Noyes Publications, 1986.

* cited by examiner

AUTOMATED RESOURCE PLANNING TOOL AND USER INTERFACE

This application claims the priority to U.S. Provisional Patent Application No. 60/711,414 filed Aug. 26, 2005, which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of resource planning, and more particularly provides an automated tool through which tasks can be assigned to individuals.

BACKGROUND OF THE INVENTION

Planning and scheduling of mission-critical operations within constrained environments such as manned and unmanned space vehicles, military and/or scientific research bases, ships, oil rigs, and factory floors, has typically been performed solely by a small group of dedicated remote persons who are not performing the operation. Space flight, for example, has historically been managed from the ground. In the United States, the Mission Control team at NASA's Johnson Space Center in Houston, Tex. ("JSC") has been in charge of creating and dictating the daily plans and activities for the crew. Mission Control has this responsibility because of their access to all of the pertinent information about the space flight. For example, Mission Control has insight into the vehicle's trajectory, the vehicle's attitude, what tasks need to be accomplished during that flight, what items in the vehicle are in need of repair that might hamper accomplishing a task, what items are in the vehicle's inventory, any medical considerations, and the like. As a result, the crew of a given space flight operate in a highly remote-controlled manner, with Mission Control knowing what needs to be done and telling the crew what to do and the order in which it is to be done to ensure safe vehicle operation.

The Mission Control team at JSC that is responsible for the International Space Station ("ISS") consists of fifty people, who must orchestrate the tasks for the ISS. Currently, approval of any proposed changes to the task schedule requires the approval of international ISS partners, in addition to NASA's approval. This process can take several weeks and multiple mission management and international partner meetings. This is a very expensive and very cumbersome process. In addition, the process places a heavy burden on the flight controller to recall and effectively communicate his or her knowledge of the ISS's current status.

SUMMARY OF THE INVENTION

Accordingly, the present invention is directed to an automated resource planning tool that substantially obviates one or more of the problems due to limitations and disadvantages of the related art.

In one embodiment, a means for automating the scheduling and rescheduling of tasks aboard a spacecraft is provided in a manner which accounts for available resources, such as available communications bandwidth and available power. This embodiment may therefore be utilized to ease the burden of schedule changes so that such changes can be accomplished in a more automated fashion without requiring immediate interaction with space flight controllers, thereby removing some of the responsibility and pressure from the flight controller on the ground through automation. This embodiment may be utilized to give the crew of a manned space flight, or those responsible for operations aboard an unmanned space flight, more control over the order in which tasks are accomplished.

In another embodiment, an activity scheduling tool accessible to a person responsible for the performance of an activity within a constrained environment includes a task definition user interface adapted to receive from the person an indication that a task is to be scheduled or rescheduled. The task definition user interface is further adapted to receive from the person an indication of at least one level of resources required for the task. Code is provided for utilizing such indication to automatically assign a scheduled time to the task.

Additional features and advantages of the invention will be set forth in the description which follows, and in part will be apparent from the description, or may be learned by practice of the invention. It is to be understood that both the foregoing general description and the following detailed description are exemplary and explanatory and are intended to provide further explanation of certain embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF AN EMBODIMENT

Figure 1:
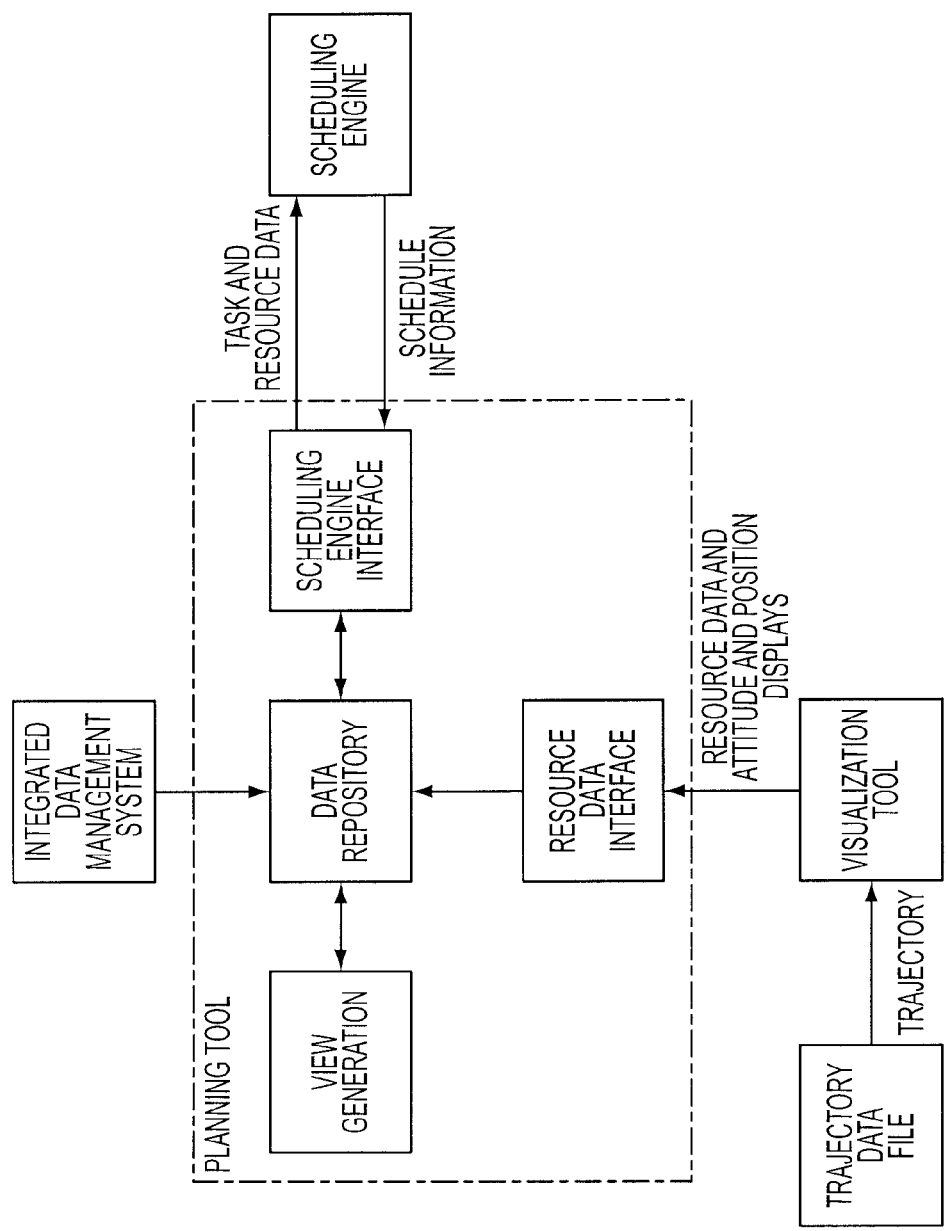
FIG. 1 is a block diagram illustrating components of the system according to one embodiment.

Reference will now be made in detail to an embodiment of the present invention, which is illustrated in the accompanying drawings.

An embodiment of the system allows a space flight crew to schedule tasks themselves apart from Mission Control. The dependencies, conditions and resources that are currently seen on the ground at Mission Control are preferably embedded into the system so that Mission Control need only send the crew a list of tasks to be performed. The crew can then schedule the tasks themselves.

The tasks performed aboard space craft may have definitions that indicate that a given activity must be performed, for example, twenty minutes after another activity and will require 10 watts of power, or that the activity has to be turned on at one time and turned off at another. The crew is able to use the intelligent software of the system to make schedule entries themselves, and the software includes code for analyzing these resource requirements and responding, for example, with an indication that the scheduled or rescheduled task can be performed at the appointed time within the bounds of dependencies, conditions, and resources associated with the task. If the proposed scheduled activity cannot be performed within those bounds, then the tool can propose an alternative schedule where the task is feasible and safe according to all the conditions and all of the definitions. If no proposed scheduled time is entered or selected when the activity is entered into the system or when it is modified, the system can select a time at which the task is feasible and safe according to all the conditions and all of the definitions.

In one embodiment, the tool removes Mission Control from some or all aspects of task planning and scheduling activities, and puts these activities in the hands of the crew in the vehicle. This gives the crew more autonomy, which can be advantageous, for example, during deep space flight missions where communication back to the earth inhibits two way interaction; during communications blackout periods, such as those encountered when orbiting the moon or another celestial body; or during periods in which communications are hampered due to weather or other factors.

As the vehicle orbits the Earth or other celestial body, the vehicle will likely face changing thermal considerations and limitations. For example, at some points along its trajectory the vehicle will become excessively hot because, when exposed to the sun, the temperature can easily reach 250° Fahrenheit above zero. Similarly, the vehicle can be exposed to extreme cold; when in the shadow of a celestial body, ambient temperatures can plummet to 250° Fahrenheit below zero. By adjusting the vehicle's attitude, the overall temperature fluctuations can be reduced, and Mission Control can avoid exposing a single portion of the vehicle to a temperature extreme for a significant period of time.

While attitude adjustments can reduce temperature-related problems, attitude adjustments can also restrict the vehicle's operations. A typical spacecraft has solar arrays and one or more antennae on the exterior of the vehicle. As the vehicle's attitude and/or trajectory changes, the solar arrays may no longer be aligned to receive maximum exposure to the sun. Similarly, the antennae may no longer be oriented to achieve maximum bandwidth. The system in one embodiment takes the current and predicted attitude and trajectory information into account when scheduling and rescheduling activities and predicts the power and bandwidth availability for the remainder of the mission.

The tool can also facilitate more efficient use of the vehicle's resources by utilizing computer code having logic for automatically rescheduling tasks based on a currently predicted trajectory and attitude. Thus, as the current projections of trajectory and attitude change throughout a mission, future tasks which are dependent upon trajectory and attitude may be automatically rescheduled by the system, with or without confirmation of such rescheduling by a human operator.

Although certain examples provided herein focus primarily on crews involved in space flight, it should be apparent to one skilled in the art that the tool can be readily adapted for use in alternative environments, including, without limitation, military and/or scientific research bases, cruise ships, oil rigs, factory floors, unmanned space vehicles, or other constrained environments in which it is advantageous to give those responsible for performing tasks the ability to schedule performance of these tasks, and access to relevant information.

FIG. 1 is a block diagram illustrating the architecture of the software code and data components of the system in accordance with one embodiment thereof. The planning tool includes a View Generation component for generating views, e.g., the timelines and task lists shown in FIGS. 2-21 and discussed below. A Scheduling Engine Interface component interfaces the planning tool with a Scheduling Engine, such as the Aurora scheduling system distributed by Stottler Henke, Inc. of San Mateo, Calif. The Scheduling Engine Interface utilizes the application programming interface (API) of the Scheduling Engine to send task and resource data to the Scheduling Engine in a form suitable for use by the Scheduling Engine, receives schedule information back from the Scheduling Engine, and translates such information into a form suitable for use by the planning tool. For example, the planning tool may use the Scheduling Engine Interface to specify an activity, its required resources, and its associated constraints to the Scheduling Engine and to receive time and resource assignments for the activity from the Scheduling Engine. The Scheduling Engine Interface may be in the form of a plug-in to the Scheduling Engine, and may provide additional functionality and logic to the Scheduling Engine. Of course, the Scheduling Engine itself may be integrated with the Planning Tool, in which case no interface to an external scheduling engine would be required.

With continued reference to FIG. 1, a Resource Data Interface is provided for interfacing the Planning Tool with a Visualization Tool via the Visualization Tool's API. The Visualization Tool uses trajectory data from a Trajectory Data File to generate attitude and position displays, and passes such displays, along with resource data such as available power and communications over time, to the Resource Data Interface. Suitable Visualization Tools include, e.g., Freeflyer, distributed by a.i. solutions, Inc. of Lanham, Md., Satellite Tool Kit, distributed by Analytical Graphics, Inc. of Exton, Pa., or another such tool. The Resource Data Interface may be provided as a plug-in to the Visualization tool, and may provide additional functionality and logic to the Visualization Tool.

The Trajectory Data File shown in FIG. 1 may be pre-mission predicted trajectory data, or may be created or updated by a real-time trajectory tool which calculates current and projected trajectories based on information about the vehicle. The trajectory tool can monitor information from the vehicle, such as attitude maneuvers, altitude changes (e.g. away from a celestial body, closer to the celestial body, etc.), or actual vehicle position in space to update the vehicle's trajectory. As described herein, by monitoring these trajectory changes, the overall system in general, and the scheduling tool that is the subject of the present patent application, may be configured to dynamically monitor and adjust crew schedules to use the vehicle's resources more efficiently.

As shown in FIG. 1, the planning tool may be linked to an integrated data management system. In one embodiment, the planning tool functions as part of an overall system through which a space flight can be monitored and controlled from early conception and design phases through execution. Such a system preferably includes an Integrated Data Management System for storing and accessing information about the space flight, including photographs or engineering drawings of the various vehicle components as they are assembled, procedures, problem reports, and processing data. Images in such a system can be made accessible, for example, through a graphical interface in which the images are organized in an hierarchical fashion based on the position of the photographed component on the vehicle. In such a tool, as the user drills down to find a particular component, additional information about the illustrated component(s), such as, without limitation, the manufacturer, lot number, serial number, assembly date, assembly person, procedures, problem reports, processing data, and other information can be presented or made available to the user. Such a tool can be advantageous when diagnosing problems, performing routine maintenance, and the like. An integrated data management system for providing such a tool is described in U.S. patent application Ser. No. 11/466,508 filed Aug. 23, 2006 entitled "Image and Information Management System," the entire disclosure of which is incorporated herein by reference.

Figure 2:
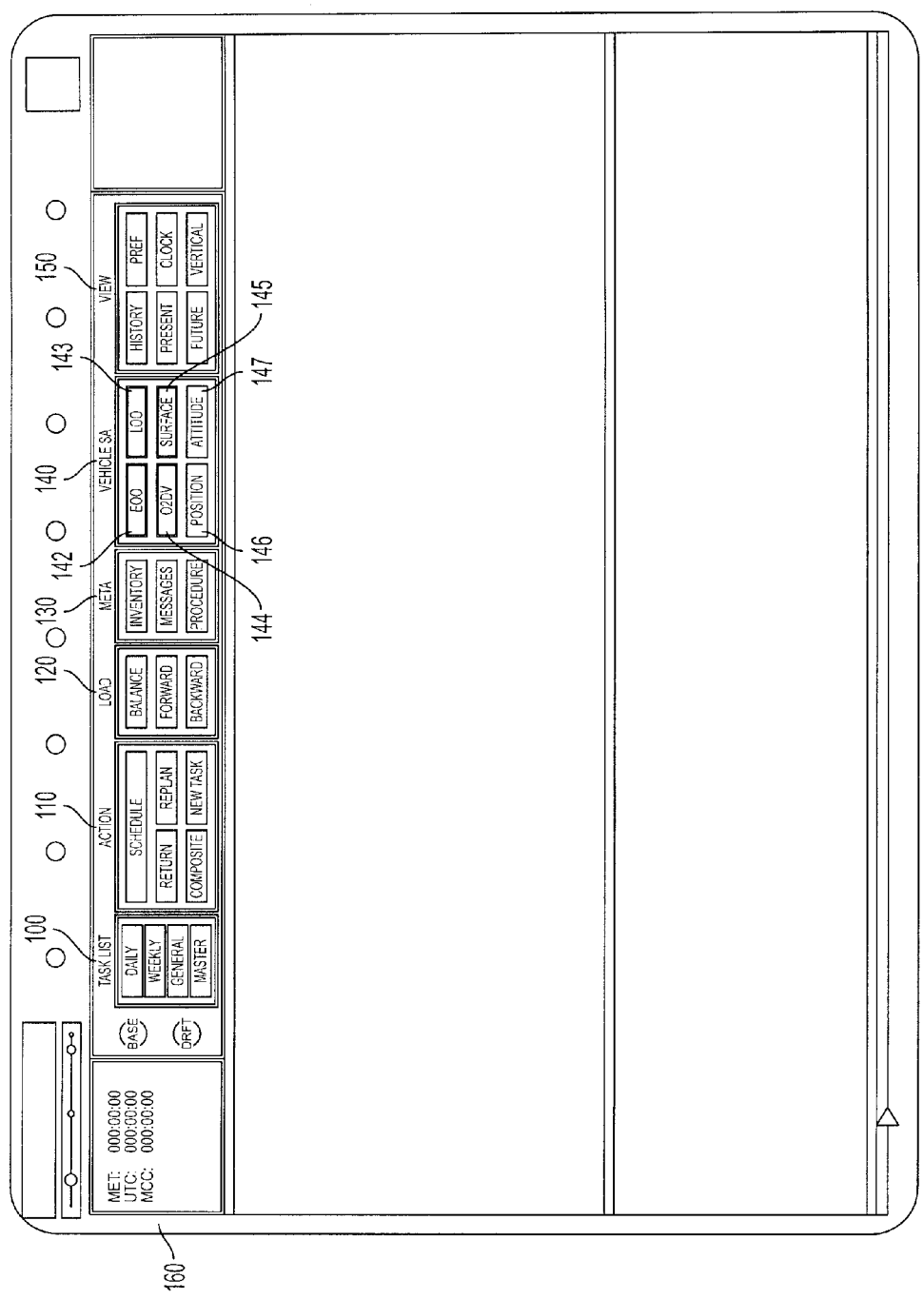
FIG. 2 is a screen capture illustrating a default application interface according to one embodiment.

FIG. 2 is a screen capture illustrating a default application interface according to one embodiment. Crew members typically prefer to have all necessary commands within such interface easily accessible. That is, rather than accessing commands through a series of one or more menu layers, the crew members prefer simple buttons or other user interface elements to be readily available in a single screen that allows such commands to be initiated. In the interface illustrated in FIG. 2, the user interface elements through which a crew member can initiate a command are represented as buttons, and these buttons are arranged together by command group. The command groups in FIG. 2 include Task List 100, Action 110, Load 120, Meta 130, Vehicle Situational Awareness ("SA") 140, and View 150. FIG. 2 also includes a user interface element displaying the current time, time to a next task, and the like (Clocks 160). Vehicle SA 140 includes a plurality of buttons, including Earth Orbit Operations ("EOO") 142, Lunar Orbit Operations ("LOO") 143, Orbit to Destination Vicinity ("O2DV") 144, Surface 145, Position 146, and Attitude 147. Selecting EOO 142 causes the user interface to reconfigure and resemble FIG. 3.

Figure 3:
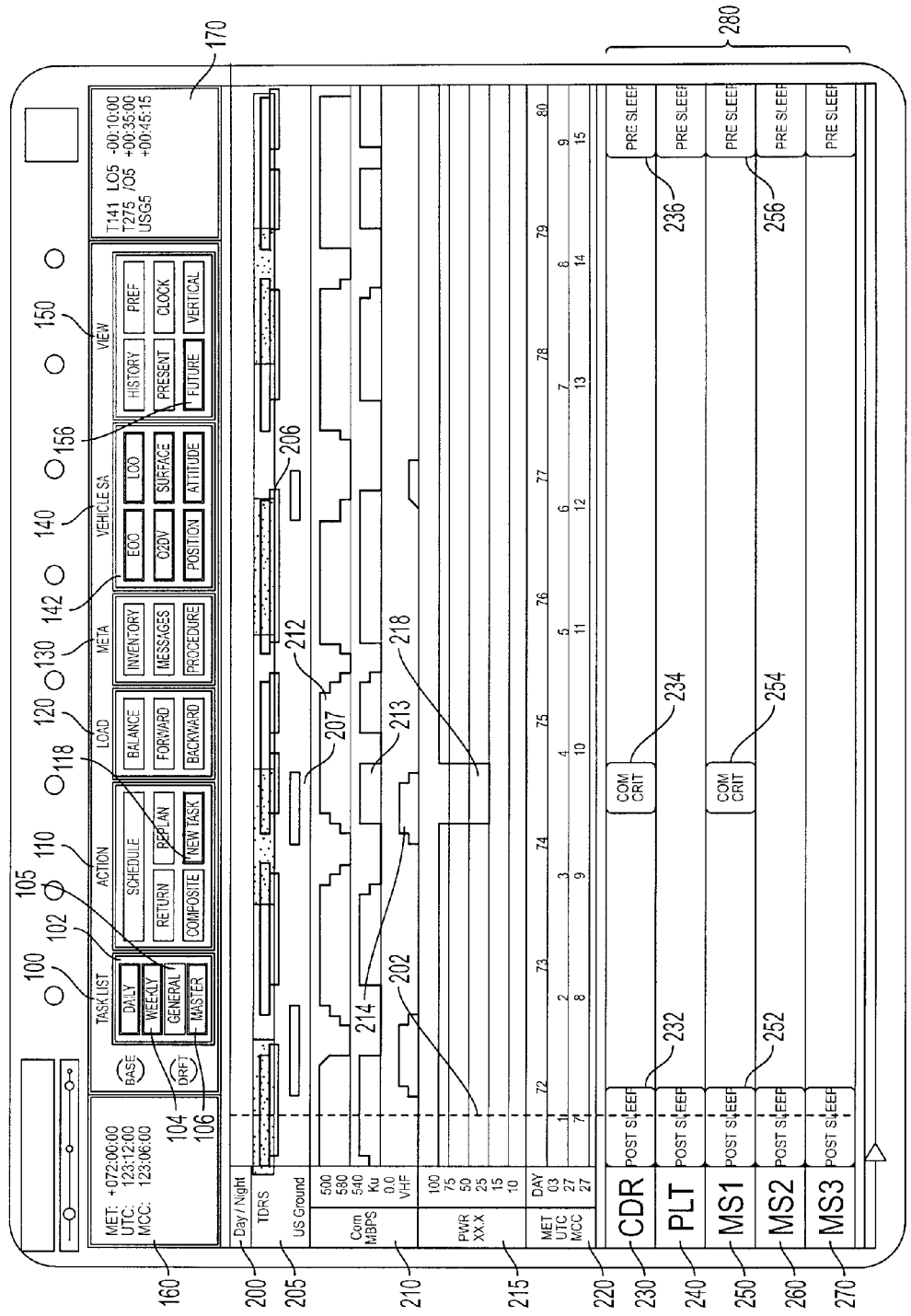
FIG. 3 is a screen capture illustrating a sample user interface providing a graphical overview of tasks to be performed on a given day.

FIG. 3 is a sample user interface providing an overview of the tasks to be performed on a given day, according to one embodiment. The current time is presented in current time window 160, and the vehicle's current trajectory is represented in trajectory window 170. Task List 280 of FIG. 3 provides a graphical representation of the tasks to be accomplished by the flight crew on a given crew day. Timeline 220 provides a time reference within the illustrated crew day. Timeline 220 can provide a plurality of time references, including without limitation, mission elapsed time ("MET"), coordinated universal time ("UTC") and the time at Mission Control Center ("MCC"). Dashed line 202 indicates the current time. The flight crew can use this information to determine when a given task is to begin or end.

A flight crew typically consists of a commander ("CDR"), pilot ("PLT"), and three mission specialists ("MS1", "MS2", and "MS3", respectively). Task List 280 allows CDR 230, PLT 240, MS1 250, MS2 260, and MS3 270 to easily view their tasks for the day. In FIG. 3, CDR 230 and MS1 250 have a critical communication, represented by Com Crit 234 and Com Crit 254, scheduled to begin two hours after their post sleep activities (post sleep 232 and post sleep 252, respectively).

The interface of FIG. 3 can also provide the information necessary to allow the flight crew to readily evaluate potential task schedules. By way of example, FIG. 3 includes available power graph 215, available communications graphs 205, and bandwidth graph 210. Available communications graphs 205 can include, but are not limited to, communications available through the Tracking and Data Relay Satellite System (TDRSS) and through one or more ground stations. This information provides the crew with ready access to an estimation of whether a given task will consume too many of the station's resources to be scheduled concurrently with another task. For example, power graph 215 shows that three and one half hours into the crew's day (represented as UTC 3 in Timeline 220), CDR 230 and MS1 250 will be initiating communications with the ground. During this time, the communications will consume approximately seventy-five percent (75%) of the vehicle's power, as illustrated by dip 218 in power graph 215. By viewing the user interface illustrated in FIG. 3, PLT 240, MS2, and/or MS3 can easily determine that they should not undertake a task or tasks that collectively require more than twenty-five percent (25%) of the vehicle's power during that time. In addition, as further described below, if one or more crew members were to attempt to schedule such a task, the tool of the invention can provide feedback advising that such a task is not advisable at that time.

Another aspect of the system in the present embodiment is that it can monitor the vehicle's trajectory in real-time or near-real-time, and advise the crew and/or Mission Control when a scheduled task is no longer feasible due to changes in the vehicle's trajectory. The tool can also automatically propose a new schedule based on the new trajectory.

In one embodiment, default tasks are entered by the Mission Control team prior to the start of the mission. Such default tasks may include, but are not limited to, crew sleep periods, interviews with television or other media, crew exercise periods, crew meal periods, maintenance activities, and the like. The timing associated with some default tasks may be critical, while the timing associated with other tasks may be more flexible. The level of criticality can be indicated by the user at the time the task is scheduled. The system can be designed such that critical tasks, e.g., Communication Critical (Com Crit) tasks 234 and 254 of FIG. 3, are unmovable or are movable only within a relatively narrow set of conditions. A Weekly 104 button under Task List 100, can be used by a crew member to display a list of those tasks that should be performed during the current week, but which may not be as time sensitive as other tasks. A sample weekly task list is shown in FIG. 4.

Figure 4:
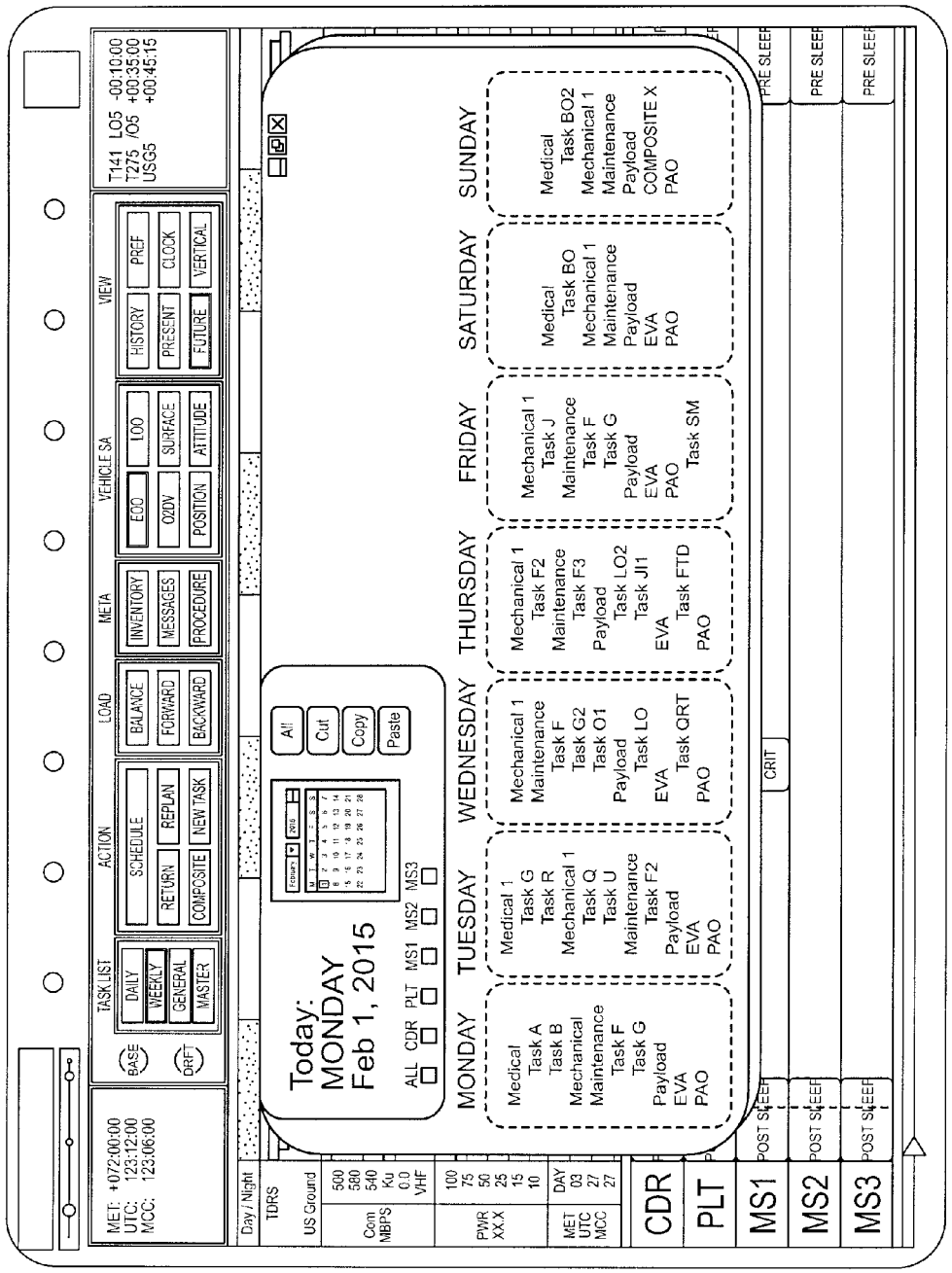
FIG. 4 is a screen capture illustrating a sample user interface for a weekly task list.

As FIG. 4 illustrates, the crew member using the tool is presented with a list of all tasks that are to be performed in a given week. The weekly task list can include a calendar tool 340 through which tasks scheduled for subsequent weeks can be viewed. By way of example, without intending to limit the present invention, the MiG Calendar tool distributed by MiG InfoCom of Uppsala, Sweden, may provide the features associated with such a calendar tool.

By clicking in the area 345 around "Today," a crew member can cause calendar 340 to jump back to the current week's calendar. If the crew member wishes, the crew member can filter the displayed tasks based on the crew member to whom the tasks are currently assigned by clicking one or more of roles 330. By clicking the All button in roles 330, the crew member can restore the view to show all available tasks. The weekly task list can be broken down by day, with tasks that have already been assigned or accomplished appearing as grayed out, such as Task 3 (item 322).

It is common for some tasks to take less time than allocated in the task definition. In such an event, a crew member may wish to start another, as yet unscheduled task. The user interface illustrated in FIG. 4 allows the crew member to select a pending task and to reassign the task to himself or another crew member. The system may be designed to require that the crew member making such change has the appropriate permissions and the crew member to whom the task is assigned is authorized to perform the task.

Figure 5:
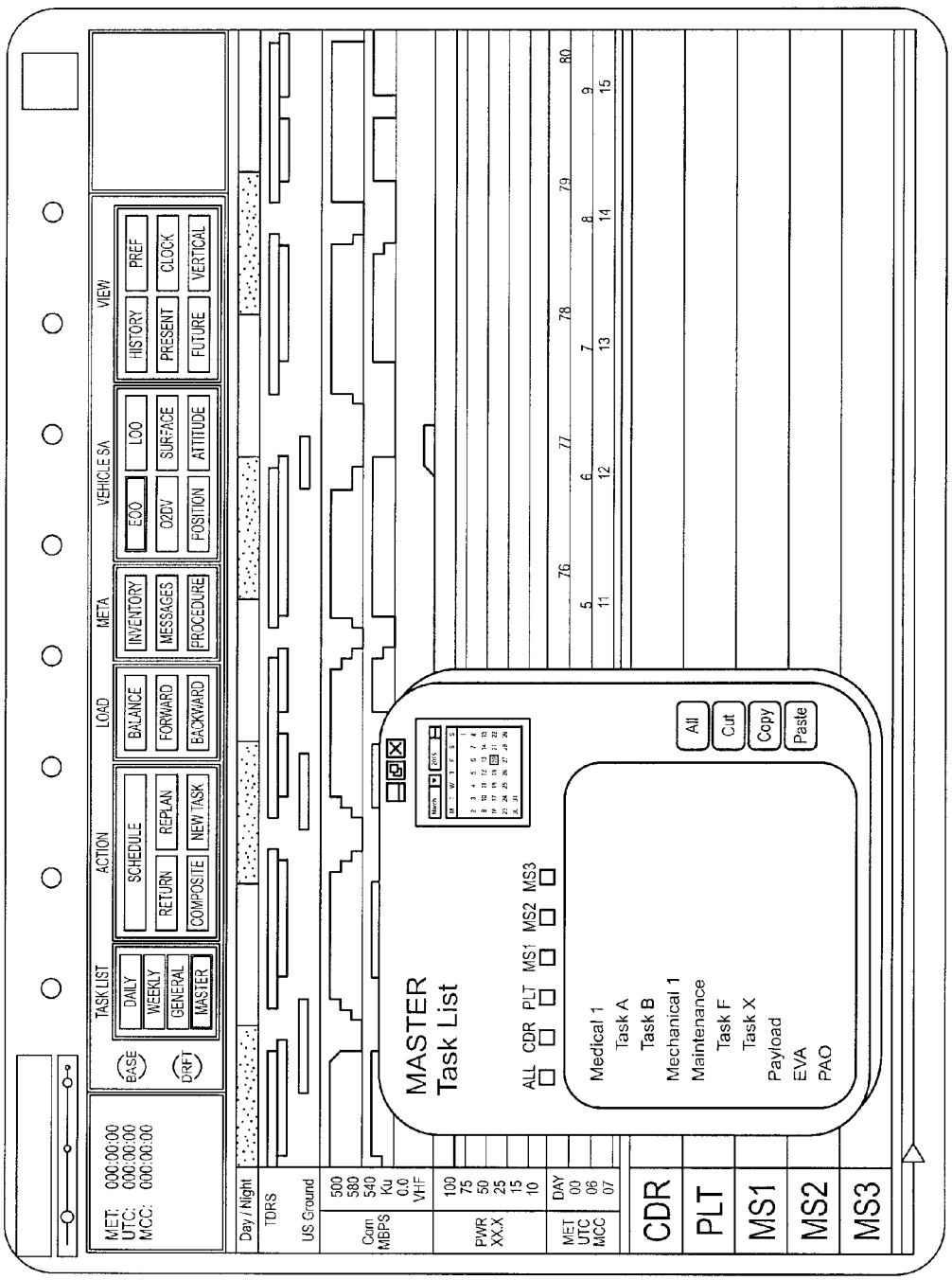
FIG. 5 is a screen capture illustrating a sample user interface for a master task list.

Referring again to FIG. 2, while many tasks to be performed on a space flight will be time sensitive, some tasks will be very basic, and will not be time sensitive at all. Such tasks can be accessed by clicking General 105. By clicking Master 106, a crew member can cause the user interface to display Master Task List 400, as illustrated in FIG. 5. Master Task List 400 can include a list 410 of all tasks that must be accomplished during a space flight. List 410 can be filtered by the crew member to whom a task is assigned using roles 430.

Figure 6:
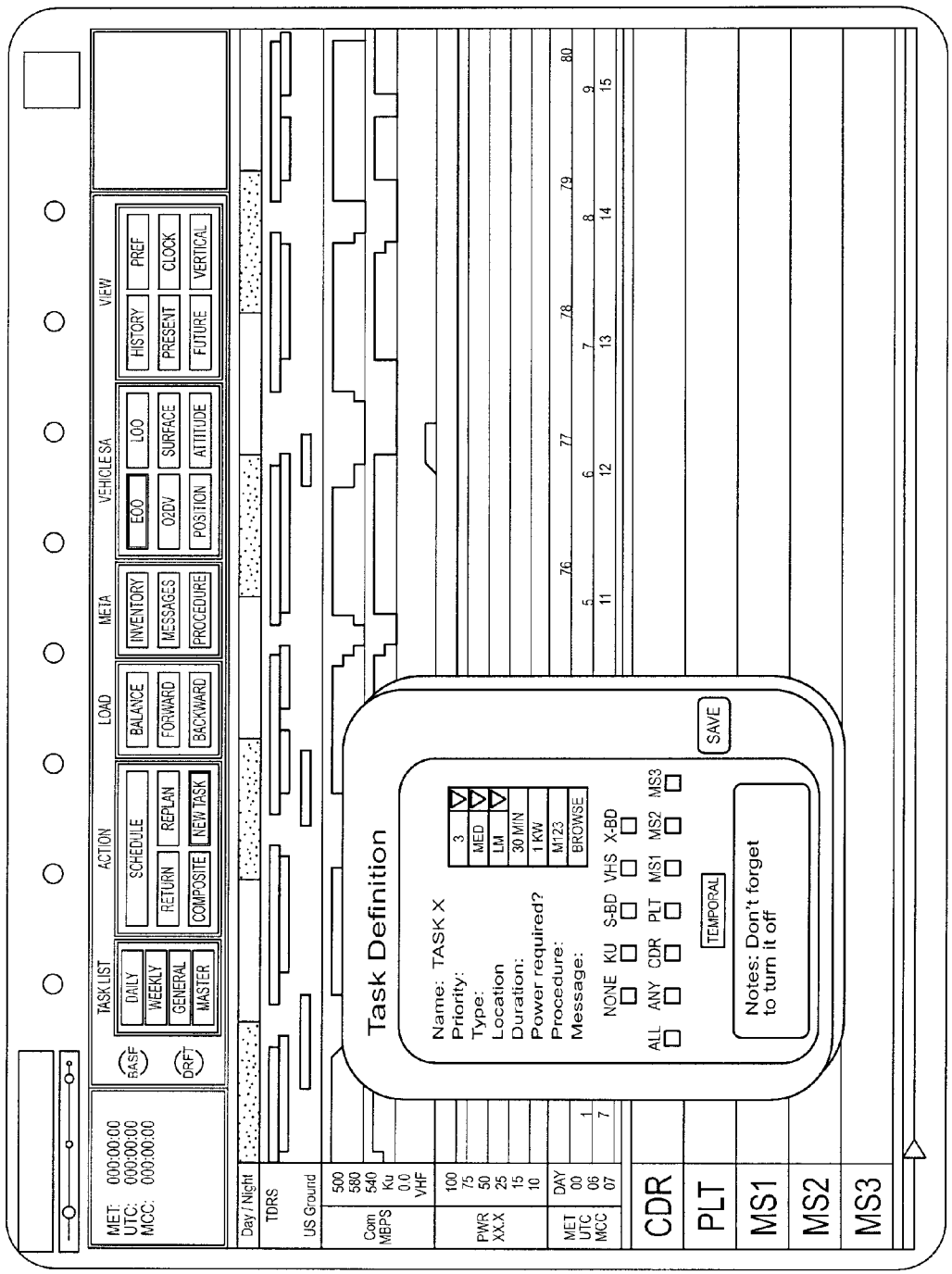
FIG. 6 is a screen capture illustrating a sample user interface for defining a new task.

FIG. 6 illustrates an interface through which new tasks can be defined. As FIG. 6 illustrates, each task can have a plurality of attributes associated with it, including priority, type or classification of task, location where the task is to take place, task duration, power required during the task, a procedure or instruction code, any communications requirements, the crew member or crew members who can perform the task, and any special messages, notes or images that should be displayed when the task is conducted. In this respect, photographs or engineering drawings of the various vehicle components as they are assembled, or service manual pages, or the like, can be associated with the task such that, for example, a person performing a maintenance-related task can have the parts images and service manual relevant to the task displayed at the time the task is performed. The interface shown in FIG. 5 may provide the capability for the person defining the task to associate an image with that task by linking to a hierarchically arranged database of images, as is described in detail above. A task can also have one or more temporal associations. Temporal associations allow a task to be associated with another task. Such associations allow the tool to take other processes, such as preparation or clean-up requirements, into account. By way of example, without intending to limit the present invention, a new task may be created for a television interview of two crew members that lasts 30 minutes. This 30 minute duration is critical, as communications with the ground, either through TDRSS or a ground station, are necessary to conduct the interview, and thus an appropriate time slot needs to be chosen. However, before the interview can take place, the camera and microphones need to be set up and tested, the crew members may need time to change clothes, or the like. These pre-interview tasks may not require ground communication, and thus extending the interview task to accommodate the time required to perform these pre-interview tasks may result in inefficient scheduling of the vehicle's communications systems. By creating a separate task entry for the pre-interview tasks, but linking it with an interview task, the vehicle's resources can be more efficiently utilized. It will be apparent to one skilled in the art that the pre-interview tasks can be further sub-divided and/or linked as necessary to promote efficient resource utilization, and that a plurality of tasks can be temporally linked.

Figure 7:
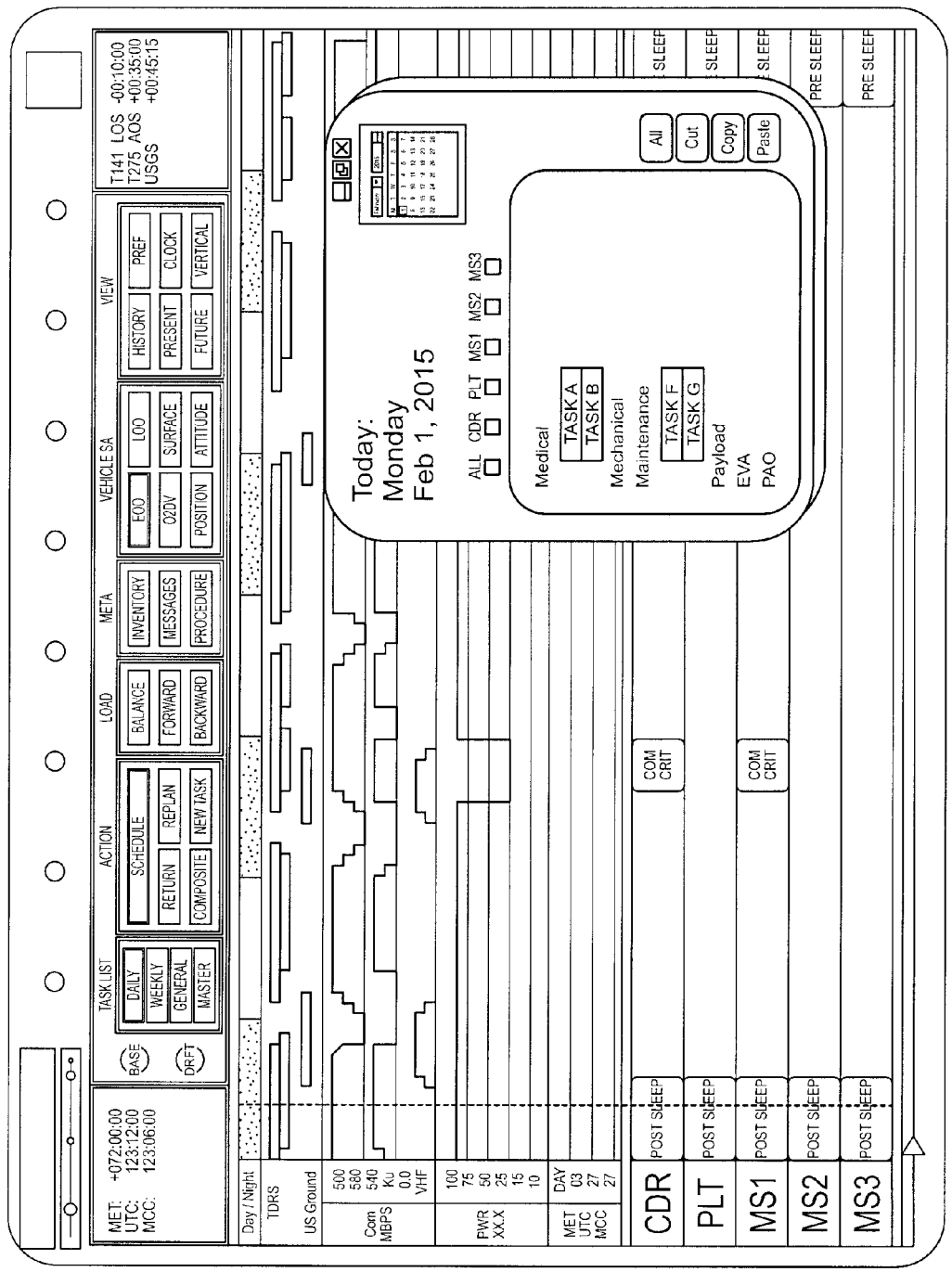
FIG. 7 is a screen capture illustrating a sample user interface for task assignment.

FIG. 7 is a screen capture illustrating a sample task assignment user interface. Daily task list 600 lists all of the tasks to be performed on the day selected in calendar control 610. The user can click on an individual task and drag and drop that task at a desired location on a crew member's timeline. If the crew member is authorized to perform the task, and if the task meets the other parameters (e.g., does not consume more power than available, does not require more communications time or bandwidth than available, etc.), then the task is assigned to that crew member. The user can also click Schedule button 640, and the tool will automatically assign the day's tasks based on crew member availability.

Figure 8:
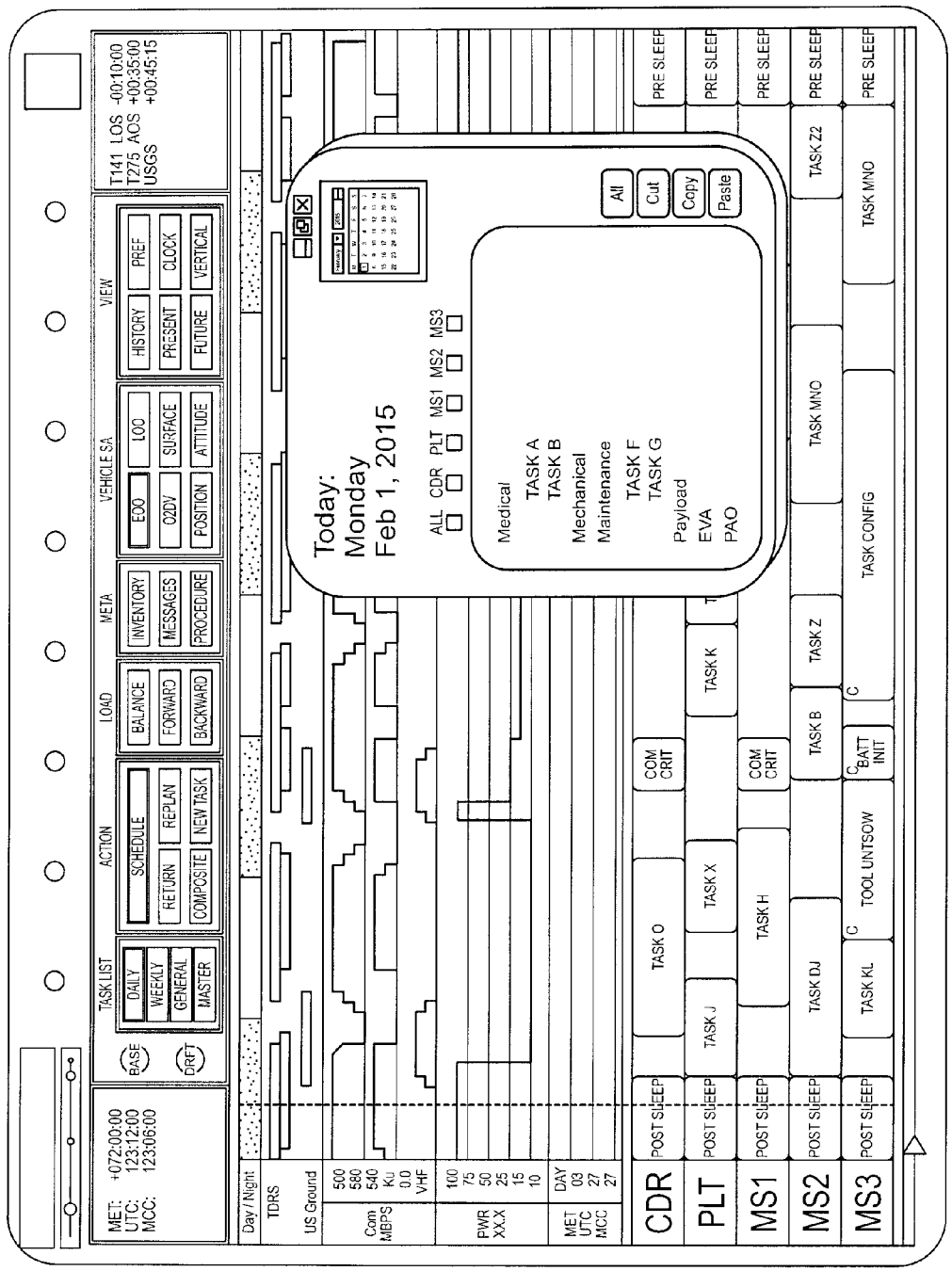
FIG. 8 is a screen capture illustrating a sample user interface after an automated task assignment.

In one embodiment, the task scheduling algorithm schedules tasks based on priority and resource usage. In this embodiment, the highest priority tasks for that day are assigned first, thereby assuring that as many of these tasks will be accomplished as possible. If a plurality of high-priority tasks are to be scheduled, the algorithm implemented in this embodiment starts with those that require the least power, thereby potentially allowing multiple tasks to be performed simultaneously. If a plurality of high priority, low-power-requirement tasks are to be scheduled, the algorithm begins with the task which the fewest number of crew members are authorized to perform. In an alternative embodiment, fuzzy logic or other artificial intelligence algorithms may be utilized to facilitate scheduling. FIG. 8 illustrates the results of an automatic scheduling of the tasks in daily task list 600 of FIG. 7.

The tool of the invention in one embodiment can also allow a crew member who is performing a given task to amend and annotate the task while the task is in progress. By way of example, without intending to limit the present invention, if a task is taking longer than scheduled, the crew member can change the duration of that task by simply clicking it and extending the end time. If the ending time extends into a future task, the tool can automatically advise the crew member if the future task is a higher priority task and whether either the future or current task can be rescheduled or reassigned to another crew member. The crew member can also enter status information about a task currently being performed. By right-clicking on a task, the crew member can drag a slider indicative of the percentage of the task that is complete, enter a corresponding numeric value in a text box, or otherwise indicate the current status. A text box or other field is also preferably available into which the crew member can enter notes, such as "lunch break", "stopped task because instructions were confusing . . . please clarify" or the like. At any time, Mission Control can access the status information and assist the crew where necessary.

In addition to providing a scheduling interface that can be used throughout a mission, the tool also provides a uniform interface through which the crew can access mission-related information that is tailored to the mission's current status. For the purposes of this disclosure, such information is generally considered to be part of vehicle situation awareness. In the embodiment illustrated in the figures, the crew can access Earth orbit related information (via EOO 142), destination transit related information (via O2DV 144), destination orbit related information (via LOO 143), and surface related information (via surface 145).

Figure 9:
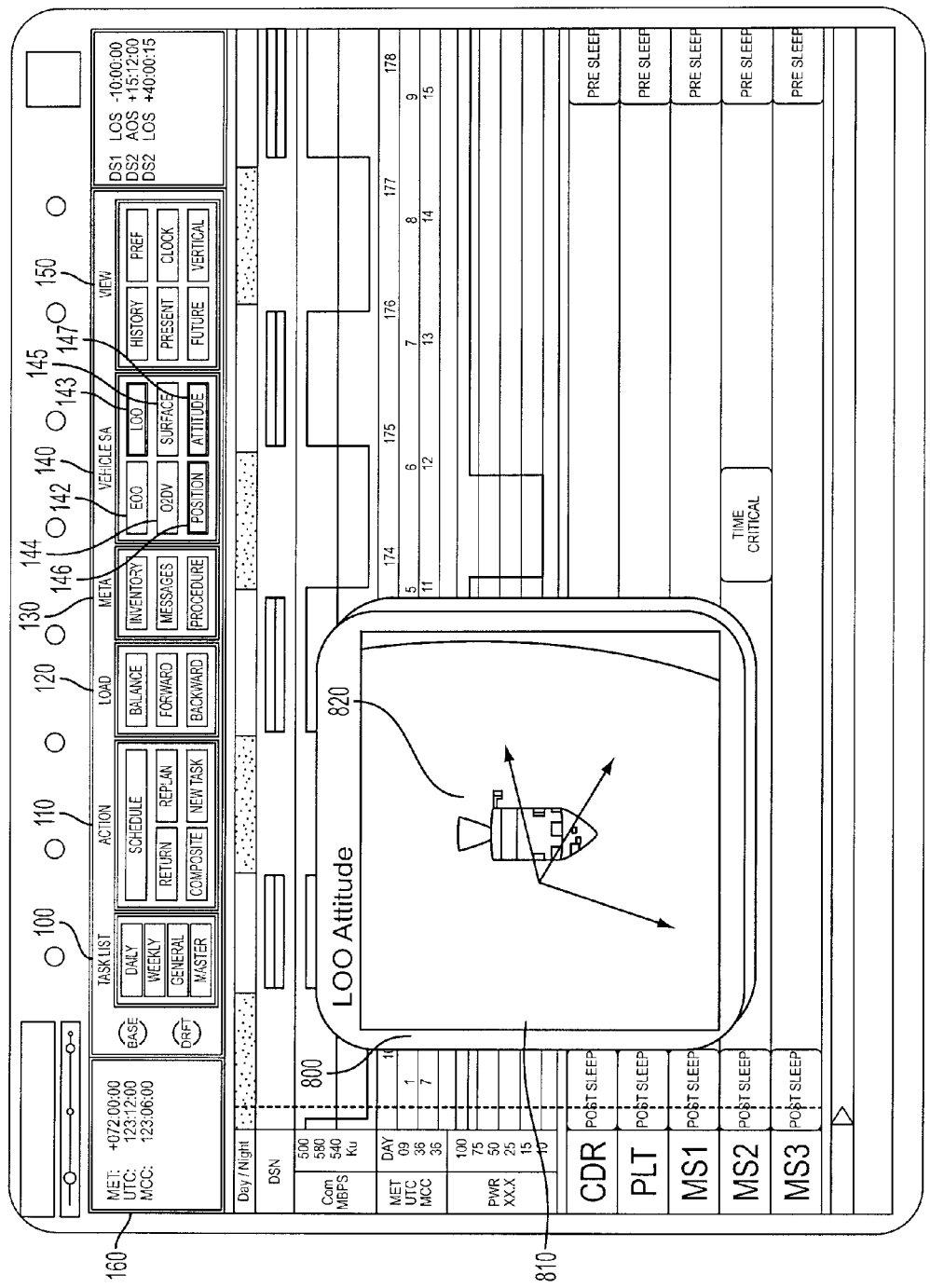
FIG. 9 is a screen capture illustrating a sample user interface for providing an orbiter's attitude with respect to the moon.

Generally, at each stage of the mission the crew has access to two types of vehicle situation awareness information, the vehicle's current position, accessed through position button 146, and the vehicle's attitude, accessed through attitude button 147. FIG. 9 is a screen capture illustrating a sample user interface for providing an orbiter's attitude with respect to the moon. LOO Attitude screen 800 provides a three-dimensional view of the vehicle 820 and the moon 810, with the vehicle accurately positioned over the appropriate portion of the moon's surface. Such a three-dimensional view may be created using a visualization tool, as discussed above with reference to FIG. 1. The vehicle position can be obtained by the tool from the vehicle itself and/or from Mission Control on a real time or periodic basis. The user can click and drag in screen 800 to rotate the view. Screen 800 also indicates the vehicle's current direction of travel.

Figure 10:
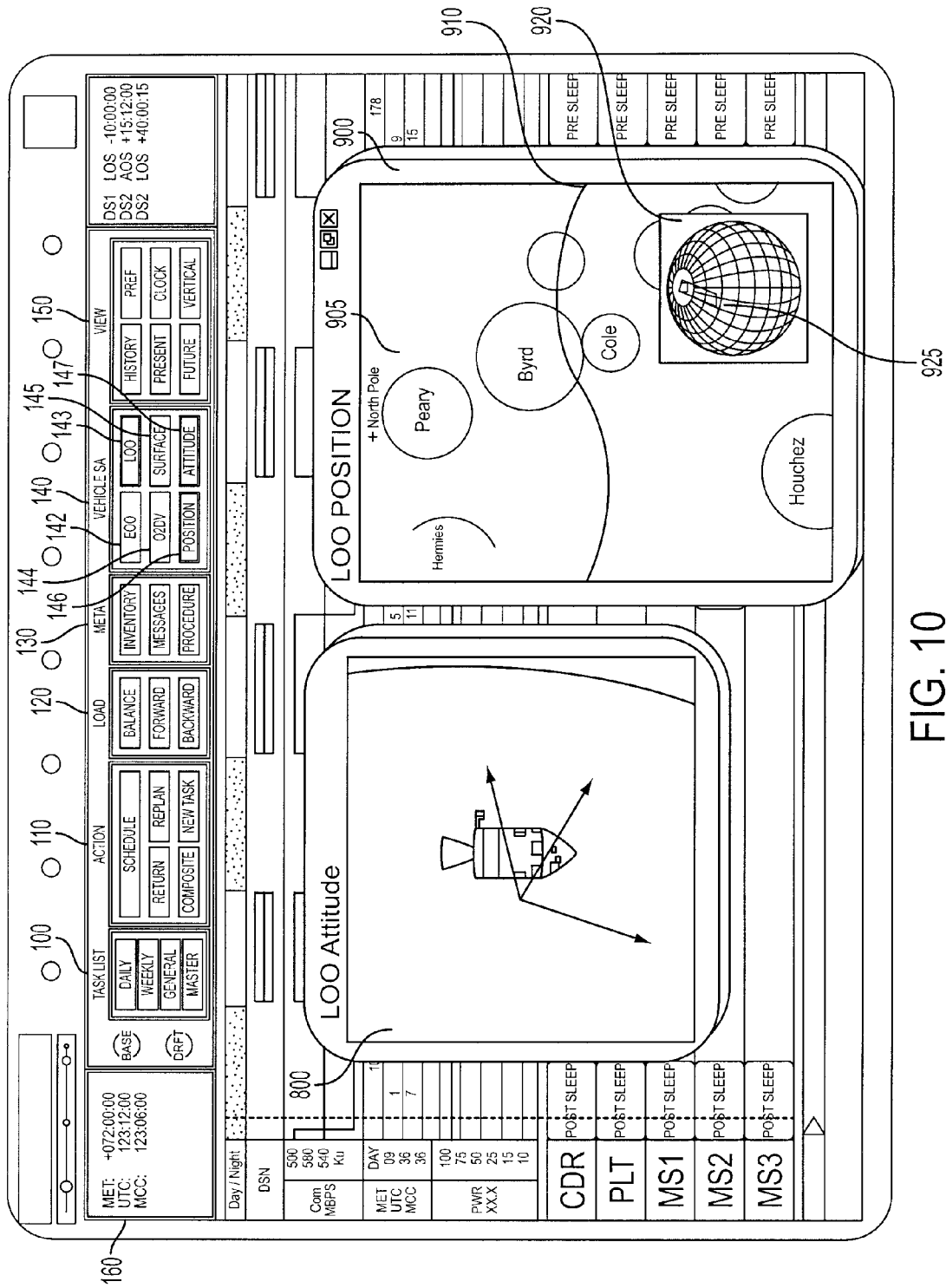
FIG. 10 is a screen capture illustrating a sample user interface for providing an orbiter's attitude and position with respect to the moon.

FIG. 10 is a screen capture illustrating a sample user interface for providing an orbiter's attitude and position with respect to the moon. In this figure, a representation of the vehicle's current trajectory (illustrated as line 910 in FIG. 10), is superimposed over a two dimensional view 905 of a portion of the lunar surface. A three dimensional, wire-frame model of the moon 920, with the wire frame representing lunar longitude and latitude lines, and the portion 925 of the model represented in the two dimensional view are also provided for reference.

Figure 11:
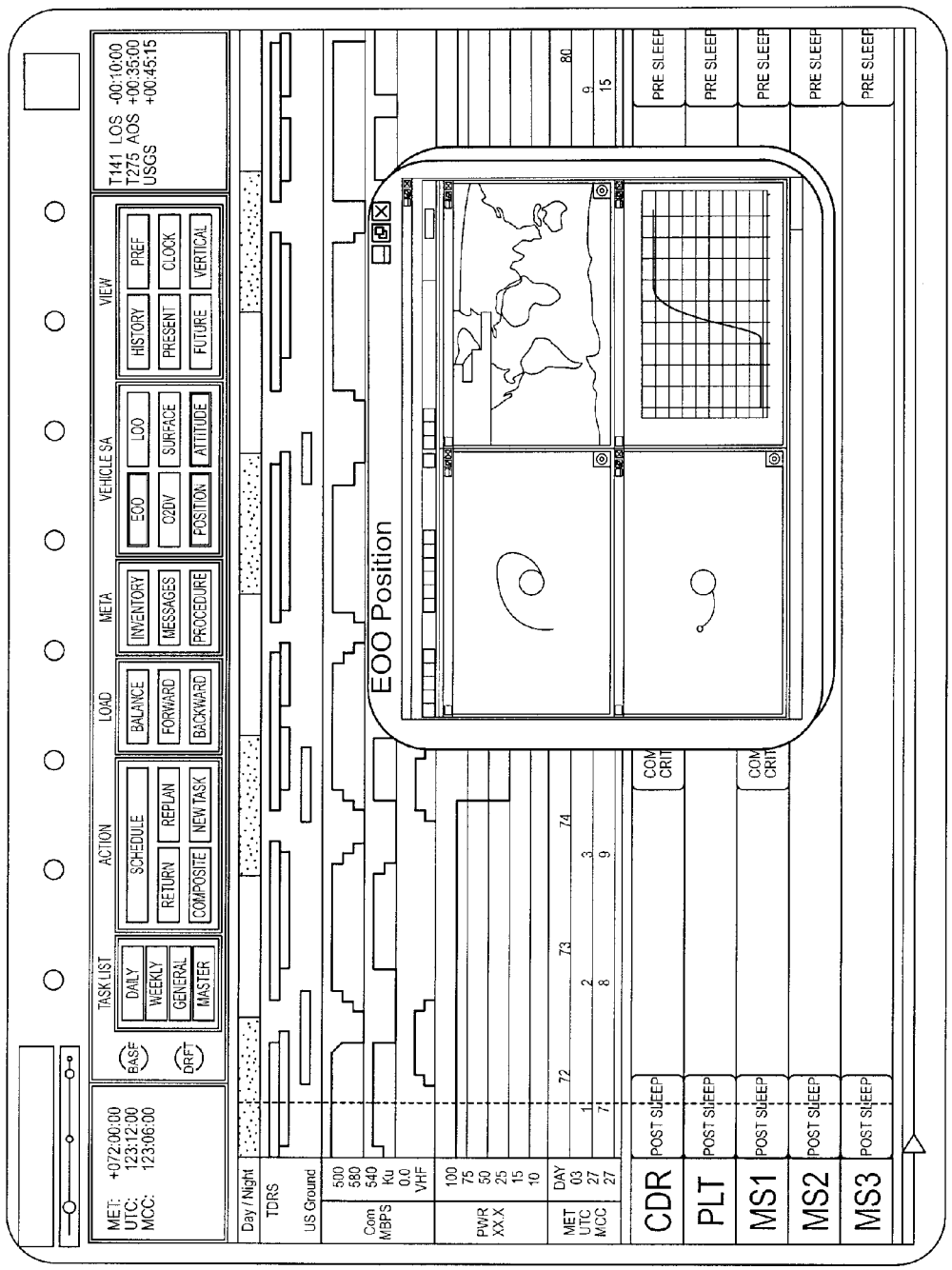
FIG. 11 is a screen capture illustrating a sample user interface for providing a vehicle's position with respect to the Earth.
Figure 12:
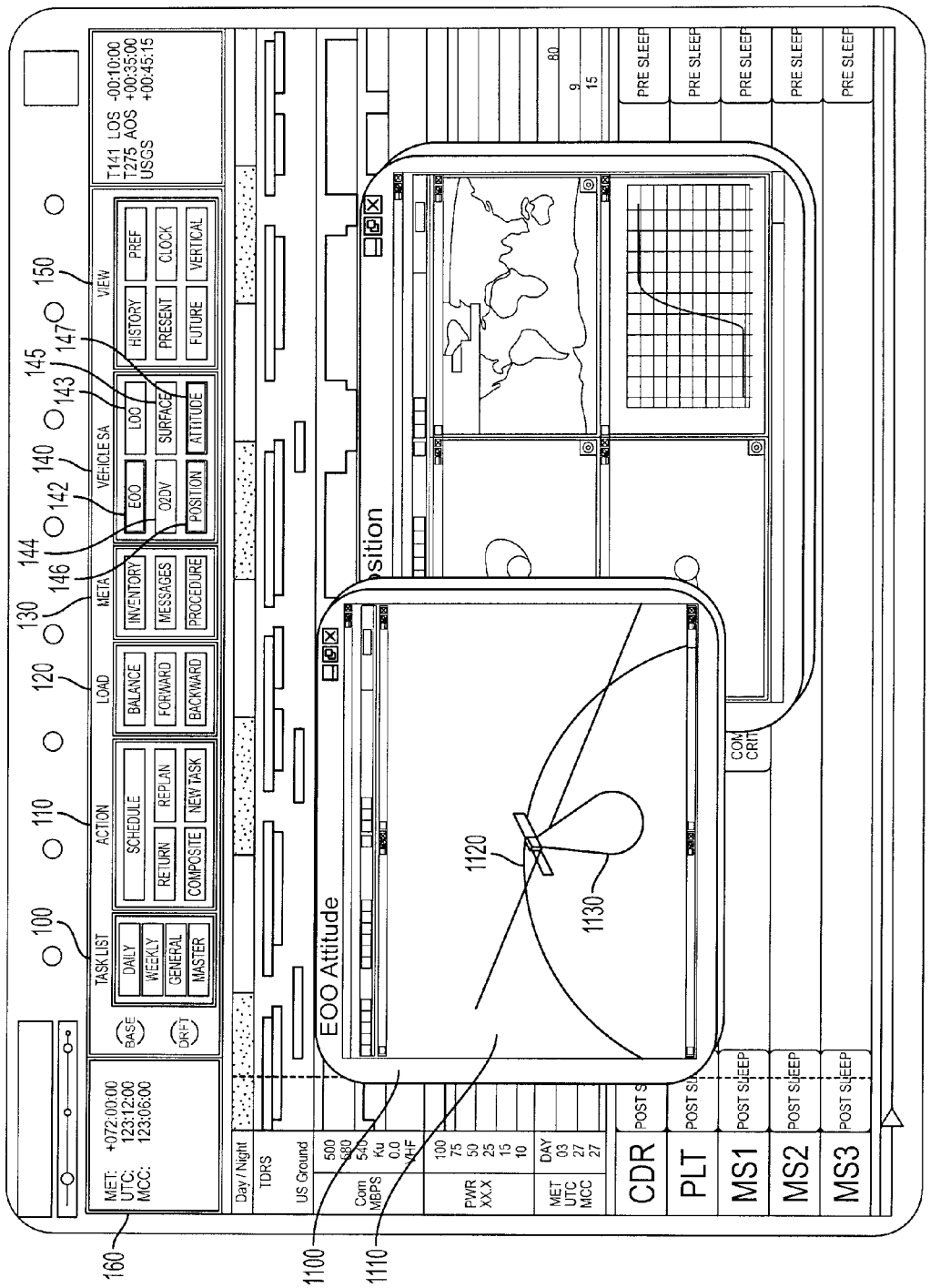
FIG. 12 is a screen capture illustrating a sample user interface for providing a vehicle's attitude with respect to the Earth.

FIG. 11 is a screen capture illustrating a sample user interface for providing a vehicle's position with respect to the Earth. As illustrated in FIG. 11, the position information can include the current vehicle trajectory, as well as a three-dimensional map of the Earth over which the trajectory is superimposed. FIG. 12 is a screen capture illustrating a sample user interface for providing a vehicle's attitude with respect to the Earth. The attitude and trajectory information can be obtained in real time from the vehicle itself or from Mission Control. As FIG. 12 illustrates, the attitude information is portrayed as a three dimensional model of the vehicle, including a representation of the current trajectory 1120 and the current coverage 1130 of the vehicle's antenna array. In one embodiment, the vehicle model can be superimposed over a three dimensional representation of the Earth. The user can click and drag in window 1100, or otherwise interact with the window, to rotate, zoom, or otherwise alter the view.

Figure 13:
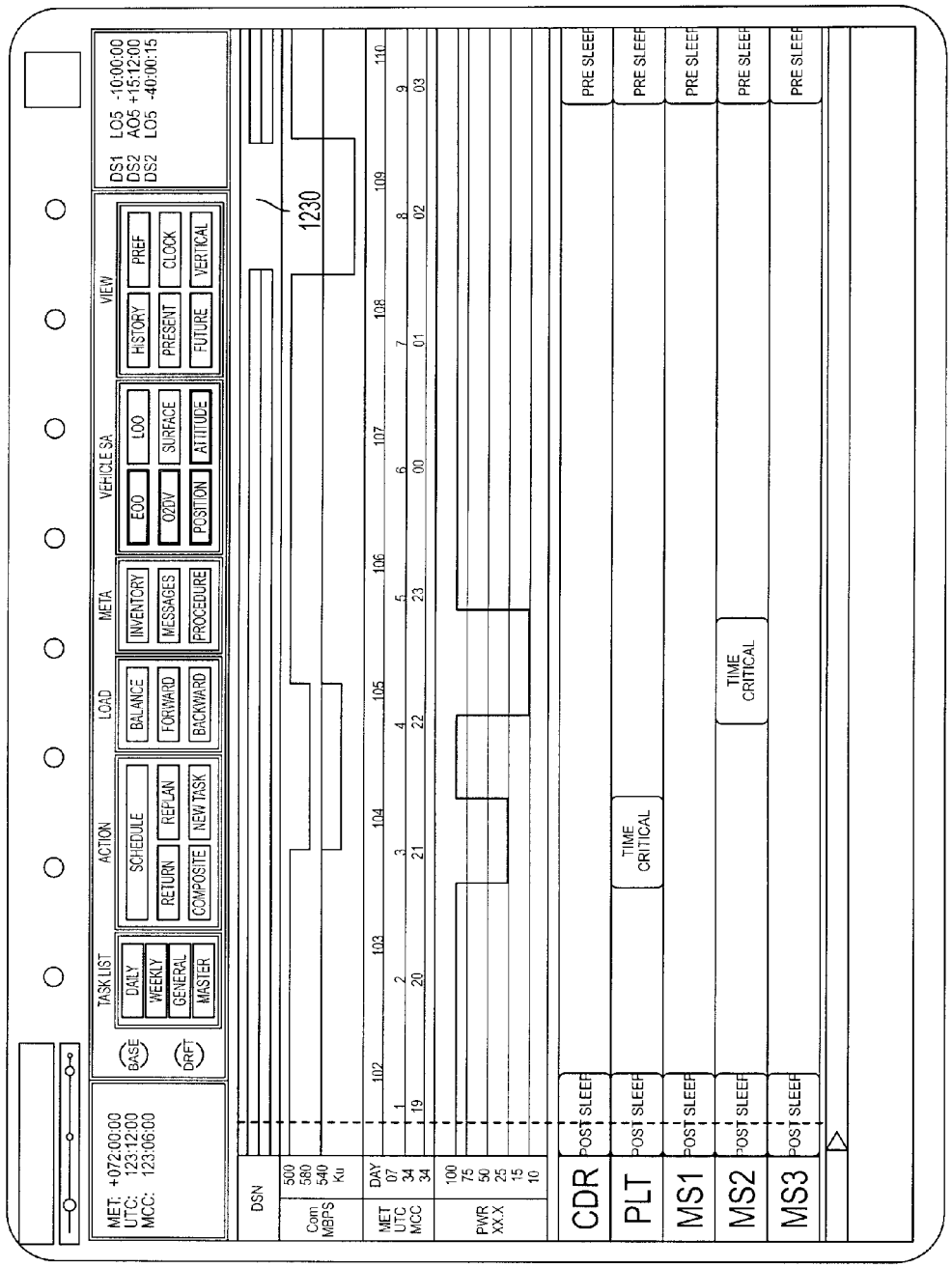
FIG. 13 is a screen capture illustrating a sample user interface for providing schedule and task information while a vehicle is in transit to a destination.

FIG. 13 is a screen capture illustrating a sample user interface for providing schedule and task information while a vehicle is in transit to a destination. It should be noted that as the mission progresses the communications means available to the vehicle are automatically updated in the tool. Thus, instead of illustrating the bandwidth and communications availabilities of the TDRSS and Earth-based ground stations, FIG. 13 illustrates the availability of the Deep Space Network 1210, or ("DSN"), to the vehicle, and the bandwidth 1220 available to the vehicle via DSN 1210. DSN 1210 is used instead of TDRSS and/or the ground stations because the vehicle is in transit to its destination, and may be outside the range of TDRS or the vehicle's attitude may not be conducive with communications with TDRSS. Gap 1230 in DSN 1210's availability may be due to the vehicle moving behind a celestial body. By contrast, dips 1240 in bandwidth 1220 may be due to the vehicle's attitude with respect to the DSN antennas.

Figure 14:
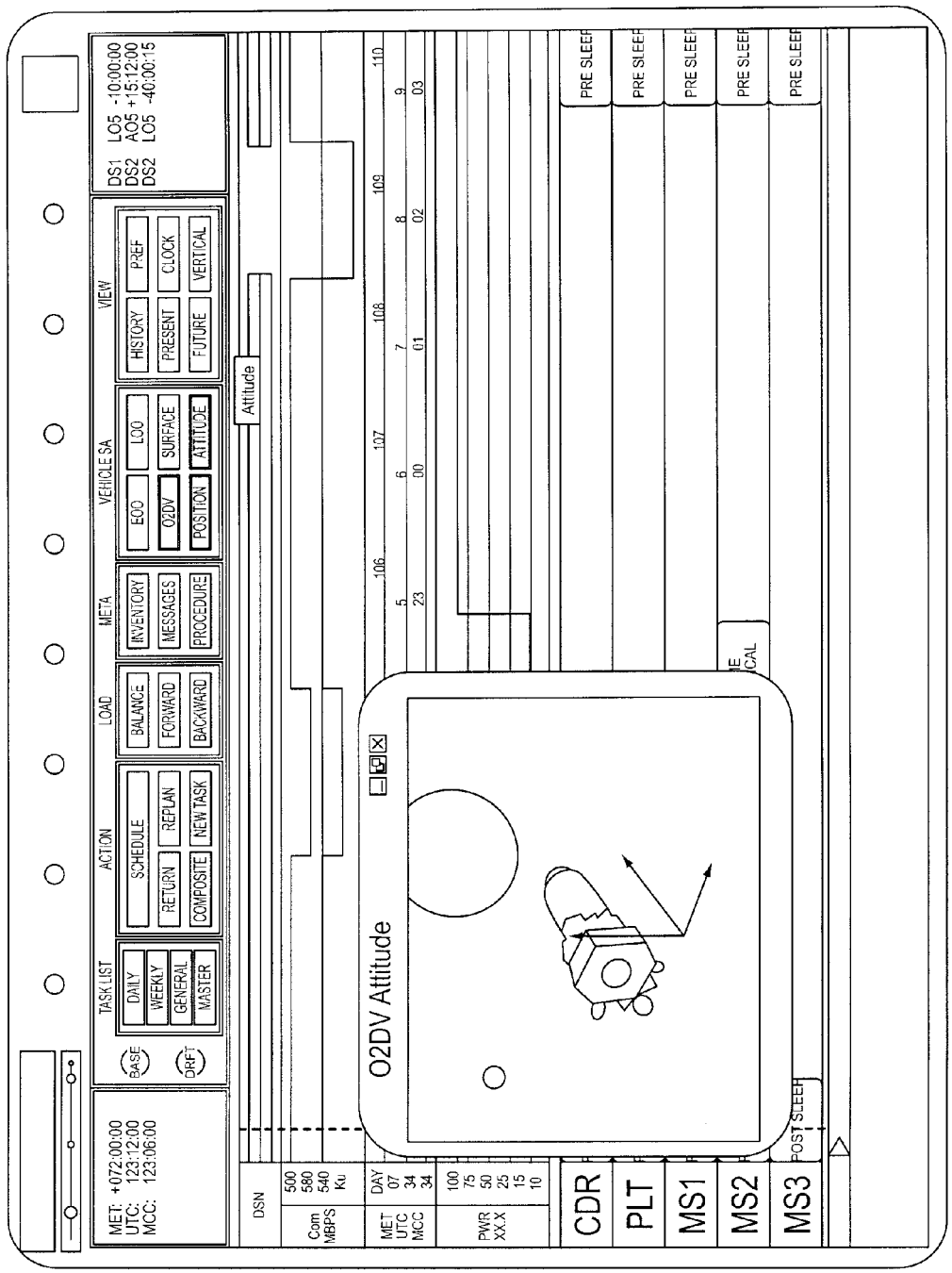
FIG. 14 is a screen capture illustrating a sample user interface for providing a vehicle's attitude while in transit to a destination.
Figure 15:
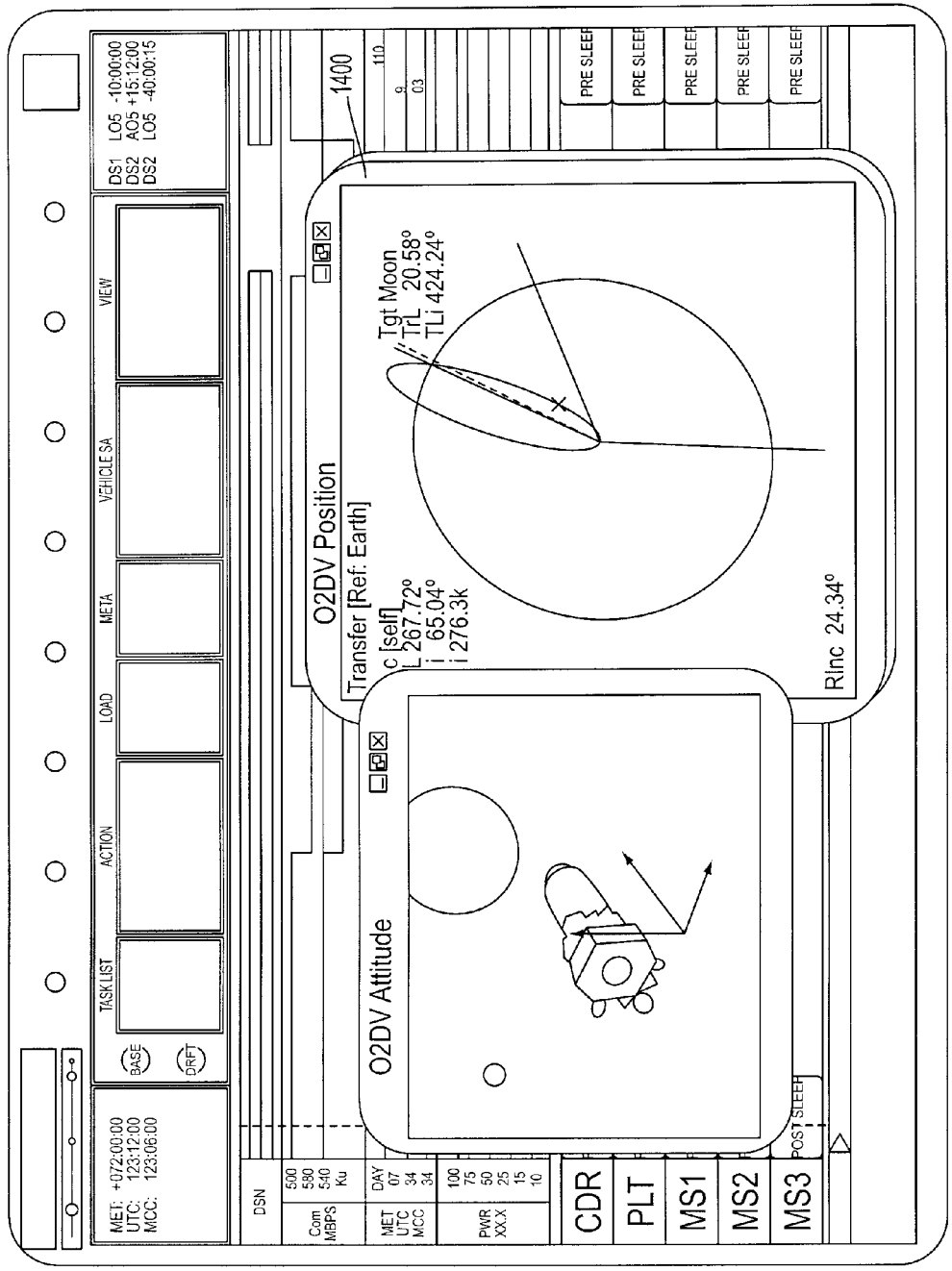
FIG. 15 is a screen capture illustrating a sample user interface for providing a vehicle's attitude and position while in transit to a destination.

FIG. 14 is a screen capture illustrating a sample user interface for providing a vehicle's attitude while in transit to a destination. FIG. 15 is a screen capture illustrating a sample user interface for providing a vehicle's attitude and position while in transit to a destination.

Figure 16:
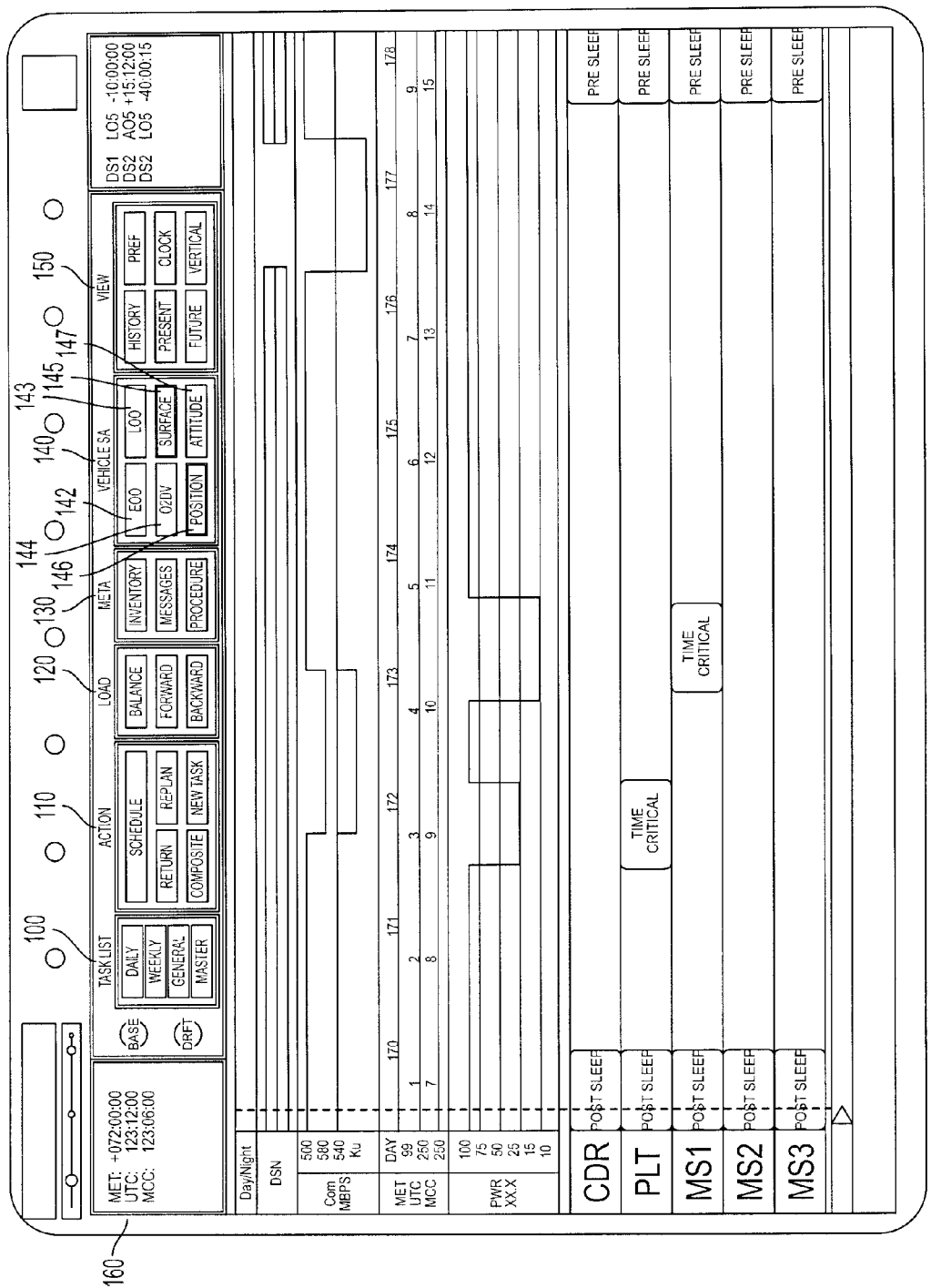
FIG. 16 is a screen capture illustrating a sample user interface for providing scheduling and task information while on the surface of a celestial body.

FIG. 16 is a screen capture illustrating a sample user interface for providing scheduling and task information while on the surface of a celestial body. The scheduling information provided at this stage in the mission is similar to that of the previous stages, except that the user interface indicates appropriate communications and power availability based on the current environment.

Figure 17:
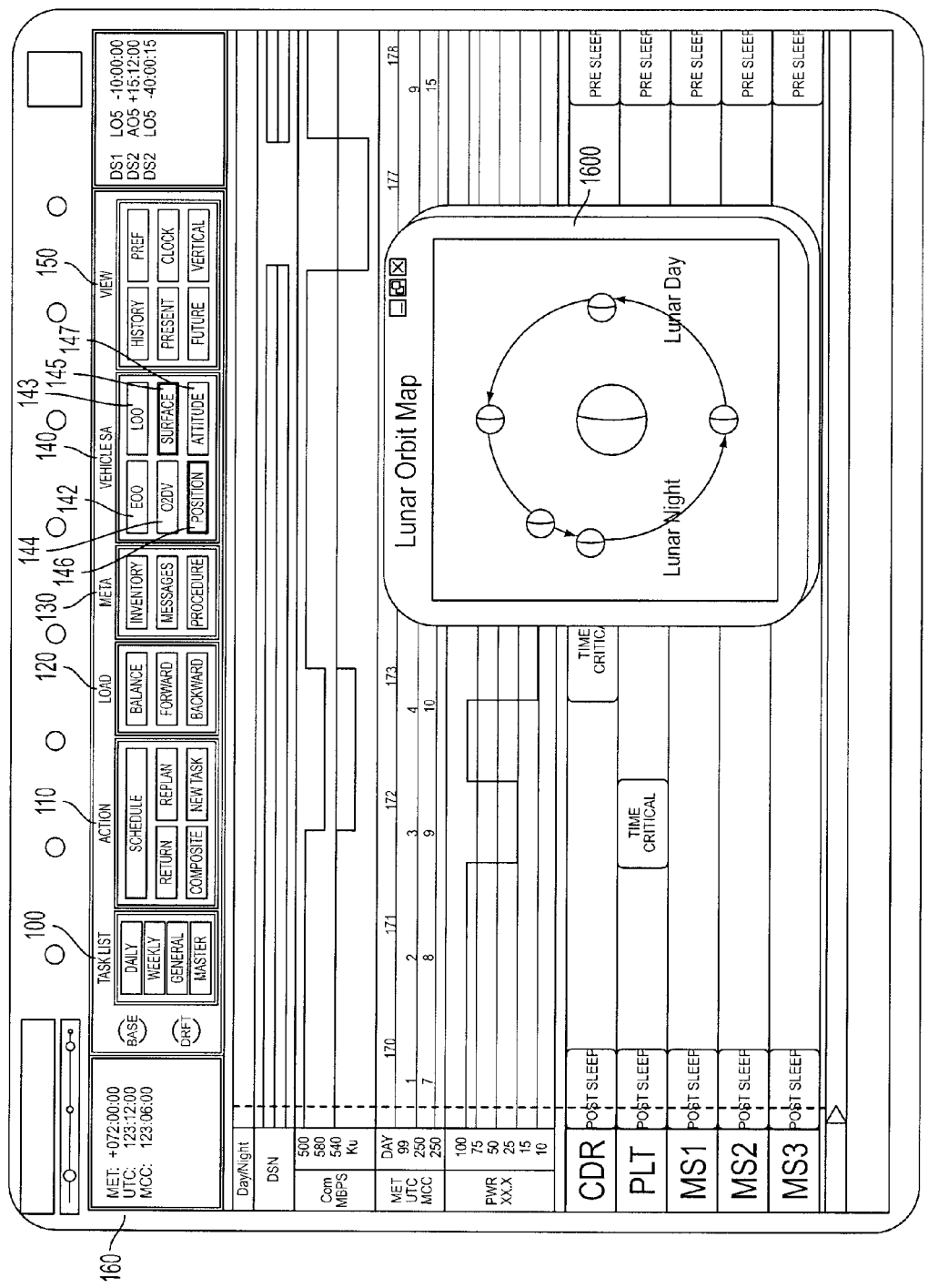
FIG. 17 is a screen capture illustrating a sample user interface for providing position information while on the surface of a celestial body.

FIG. 17 is a screen capture illustrating a sample user interface for providing position information while on the surface of a celestial body. Such position information can include, but is not limited to, the vehicle's position on the celestial body, the celestial body's orientation with respect to Earth, the vehicle's orientation with respect to Earth, or other such information.

Figure 18:
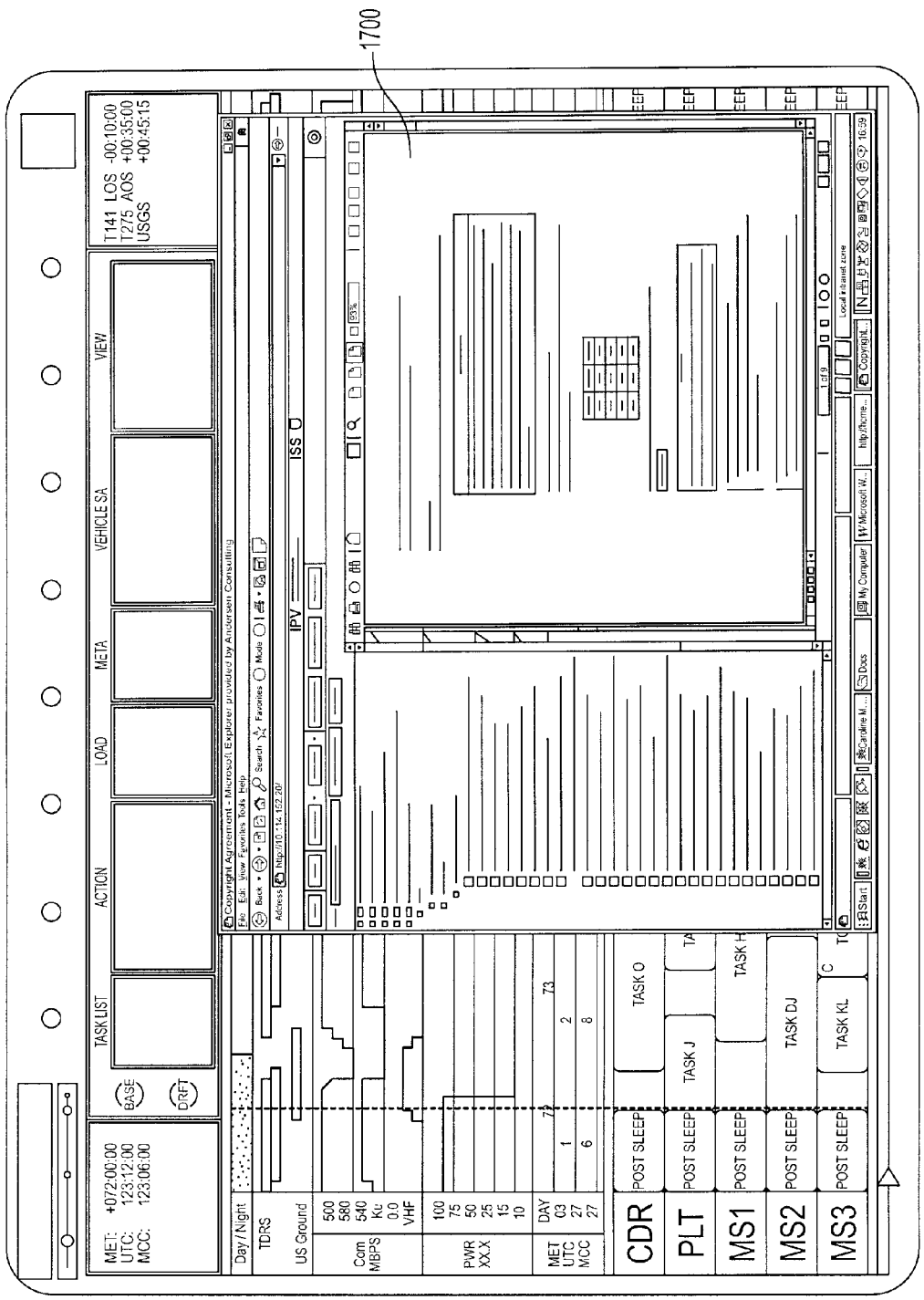
FIG. 18 is a screen capture illustrating a sample user interface for providing procedural metadata about a task.
Figure 19:
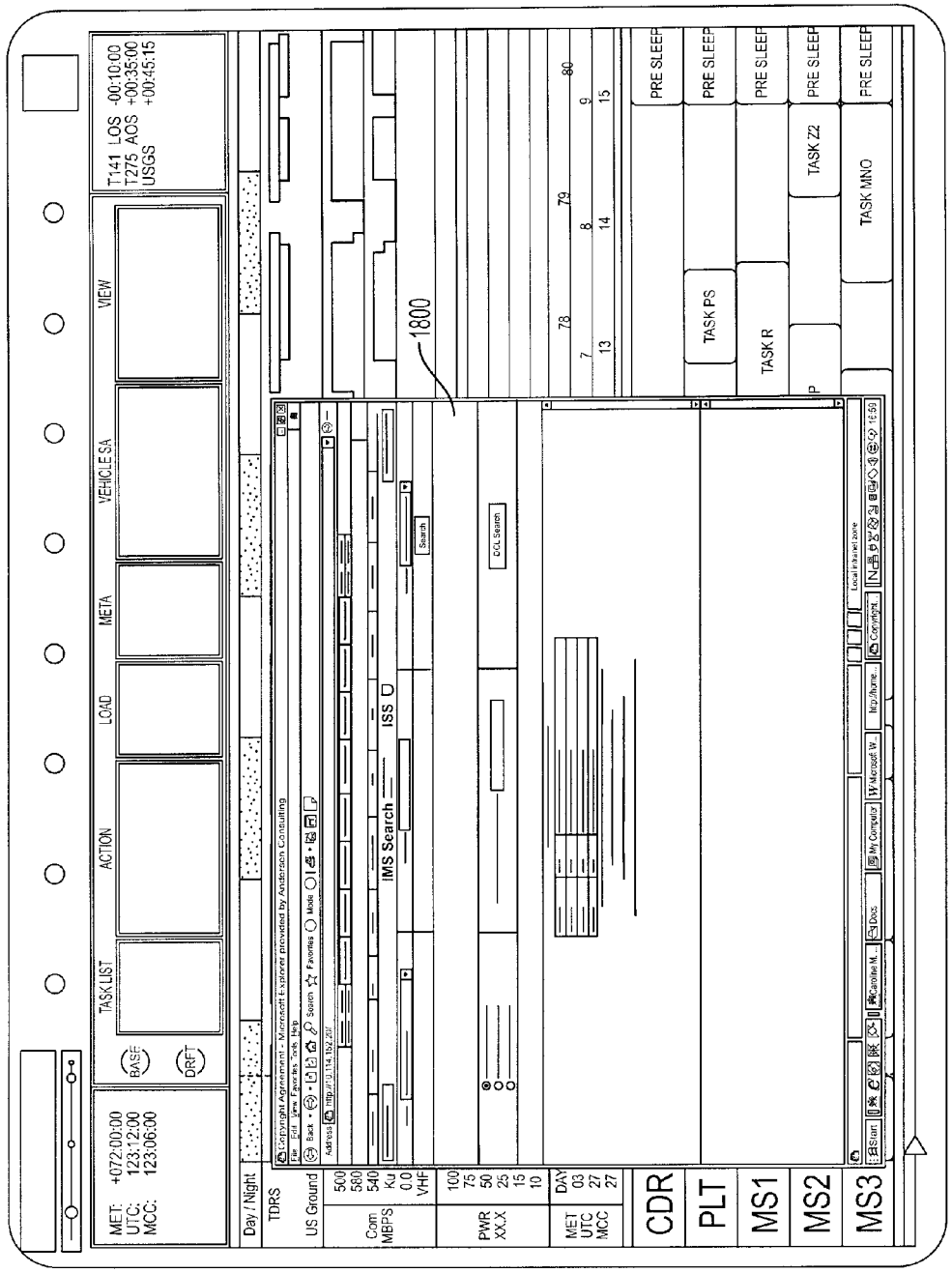
FIG. 19 is a screen capture illustrating a sample user interface for providing inventory information.
Figure 20:
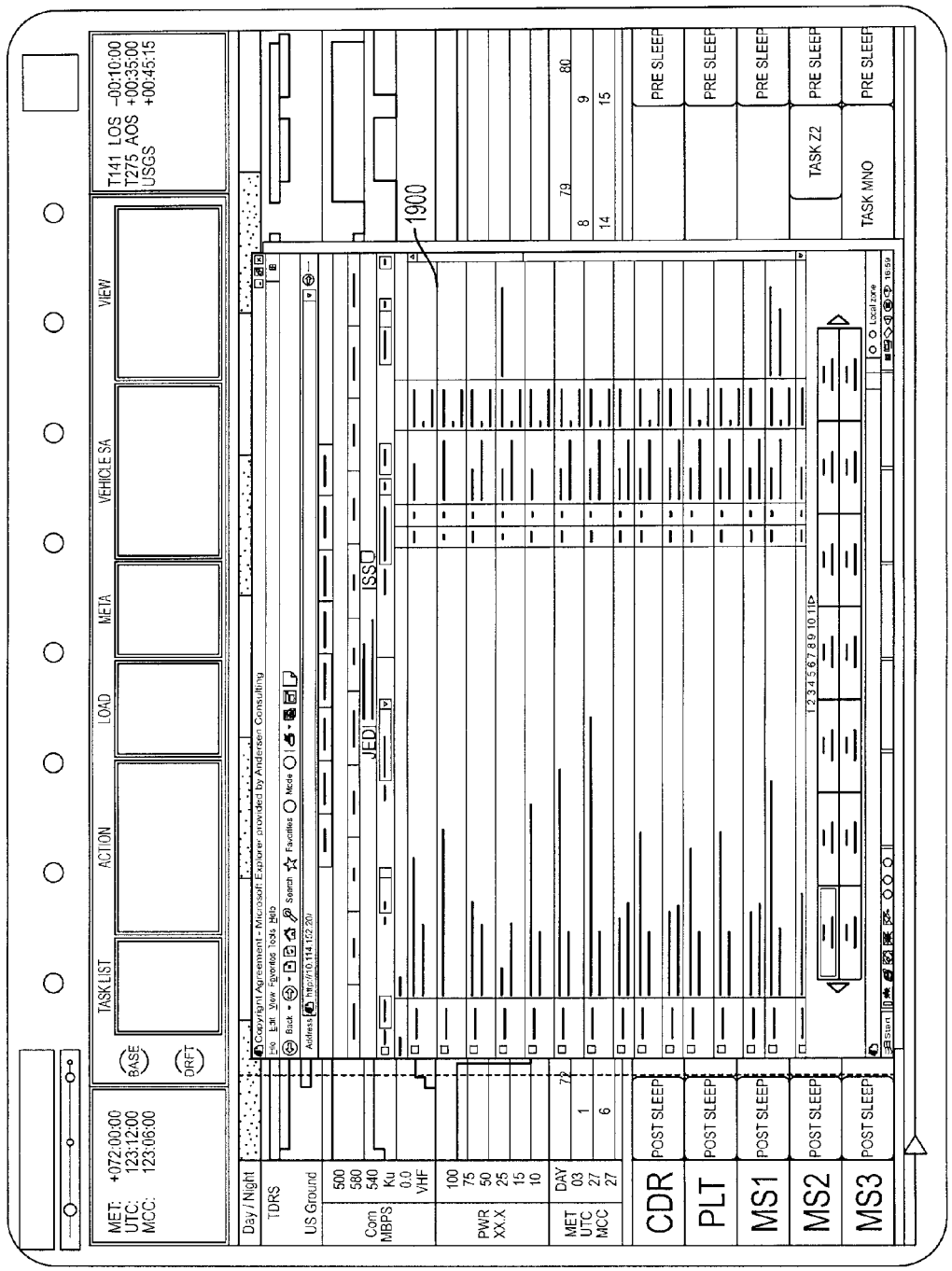
FIG. 20 is a screen capture illustrating a sample user interface for providing messaging information.
Figure 21:
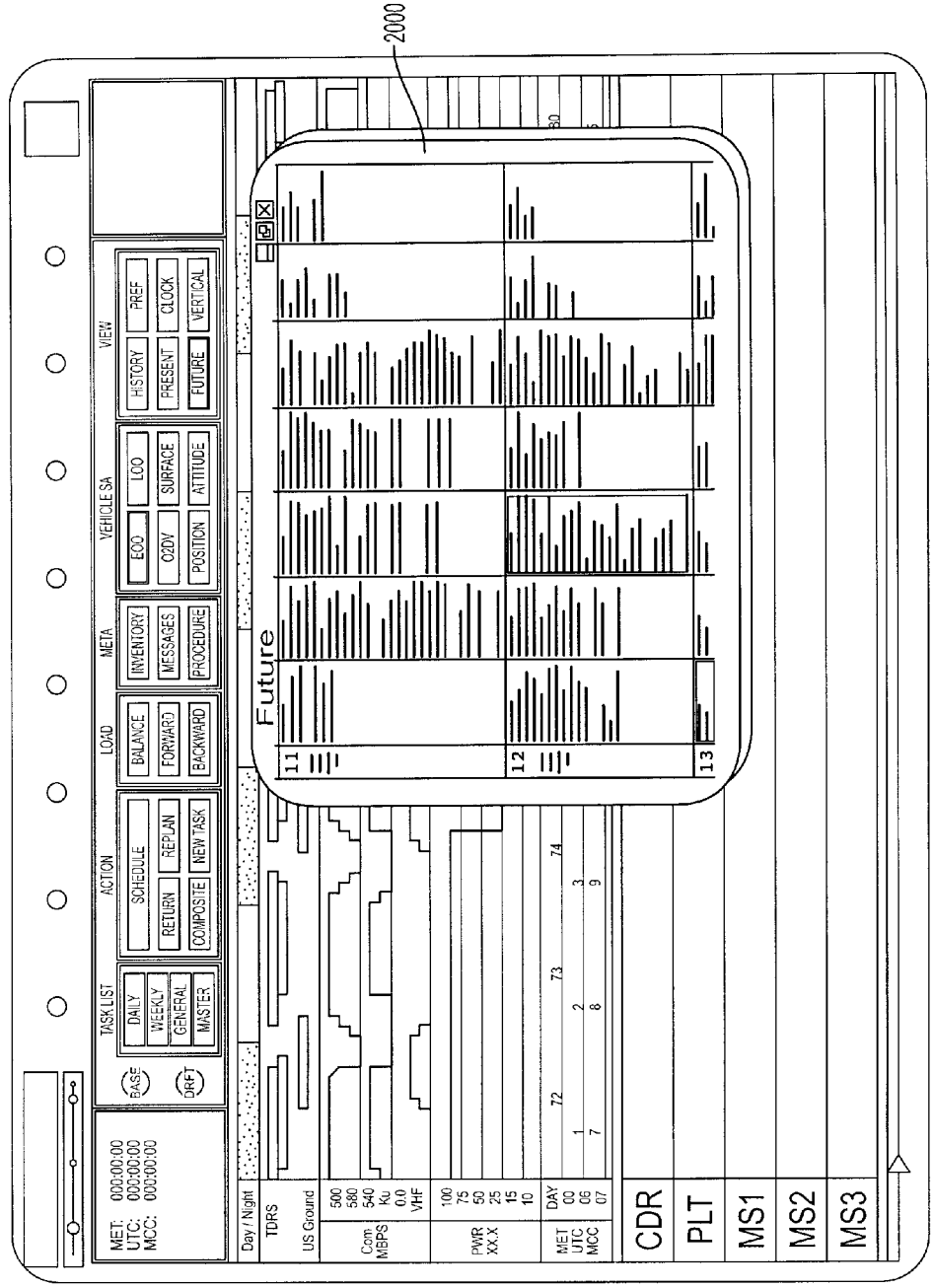
FIG. 21 is a screen capture illustrating a sample user interface for providing a list of future tasks.

As described above, the tool provides a uniform interface from which a flight crew can access information about the mission. In addition to the task, position, attitude, and status information discussed above, the tool can also provide access to instructions, tutorials, or other metadata about a task, inventory information, and messaging. The preceding feature list is intended to be exemplary and should not be construed as limiting the invention to only these features. FIG. 18 is a screen capture illustrating a sample user interface for providing procedural metadata 1700 about a task. FIG. 19 is a screen capture illustrating a sample user interface for providing inventory information 1800 to the flight crew. FIG. 20 is a screen capture illustrating a sample user interface for providing messaging information 1900. Such messaging information may include, but is not limited to, messages generated by systems onboard the vehicle, messages from one crew member to another, messages to and from Mission Control, and reminders entered by a crew member for his or her own benefit. As illustrated in FIG. 21, the tool can also allow a crew member to view a calendar 2000 with all scheduled events, also referred to as the "future view". This future view can include a master calendar which contains a task schedule as proposed pre-flight.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An activity scheduling tool accessible to the crew of a space vehicle, comprising:
   a first user interface element adapted to receive from a crew member of the space vehicle an indication that a task is to be scheduled or rescheduled, and an indication of at least one level of vehicle resources required for the task;

a second user interface element adapted to provide to the crew member of the space vehicle an indication that the task can or cannot be scheduled within the bounds of a dependency, condition, or vehicle resource associated with the task, wherein the second user interface element includes an indication that the task has been scheduled for an appointed time, and further includes a graphical display of available vehicle resources at the appointed time; and wherein the second user interface element displays a mission timeline, the mission timeline providing at least one time reference selected from the group consisting of: mission elapsed time ("MET"), coordinated universal time ("UTC") and the time at Mission Control Center ("MCC");

wherein said first user interface element and said second user interface element are generated on at least one particular machine and tangibly displayed on at least one display device, said at least one particular machine comprising at least one physical computing device.

2. The activity scheduling tool according to claim 1, wherein the dependency, condition, or resource associated with the task comprises the vehicle's projected attitude at an appointed time for the task.

3. The activity scheduling tool according to claim 1, wherein the dependency, condition, or resource associated with the task comprises the vehicles projected trajectory at the appointed time.

4. The activity scheduling tool according to claim 3, wherein the projected trajectory is calculated by a real-time trajectory tool, which calculates the projected trajectory based at least in part upon a current real-time trajectory.

5. The activity scheduling tool according to claim 1, wherein the dependency, condition, or resource associated with the task comprises the vehicle's projected electrical power availability at the appointed time.

6. The activity scheduling tool according to claim 1, wherein the dependency, condition, or resource associated with the task comprises the vehicle's projected communications bandwidth availability at the appointed time.

7. The activity scheduling tool according to claim 1, wherein the dependency, condition, or resource associated with the task comprises a temporal association.

8. The activity scheduling tool according to claim 7, wherein the temporal association comprises a dependency upon another task.

9. The activity scheduling tool according to claim 1, wherein the mission timeline provides a plurality of time references.

10. The activity scheduling tool according to claim 1, further comprising a graphical representation of available communications bandwidth at a plurality of times along said mission timeline.

11. The activity scheduling tool according to claim 1, further comprising a graphical representation of available power at a plurality of times along said mission timeline.

12. The activity scheduling tool according to claim 1, further comprising a graphical representation of scheduled tasks at a plurality of times along said mission timeline.

13. The activity scheduling tool according to claim 1, wherein the second user interface element comprises a dialog box.

14. The activity scheduling tool according to claim 1, wherein the second user interface element comprises a mission timeline showing one or more scheduled tasks associated with one or more times thereon.

15. An activity scheduling tool accessible to a person responsible for the performance of an activity within a manned or unmanned space craft, comprising:

a task definition user interface adapted to receive from a person on a space vehicle responsible for conducting a task an indication that the task is to be scheduled or rescheduled, the task definition user interface being further adapted to receive from the person on the space vehicle an indication of at least one level of resources required for the task;

code for utilizing said indication of said at least one level of resources required for the task to automatically assign a scheduled time to said task;

wherein the task definition user interface element includes an indication that the task has been scheduled for an appointed time, and further includes a graphical display of available vehicle resources at the appointed time; and, a user interface element for displaying a mission timeline, wherein the mission timeline provides at least one time reference selected from the group consisting of: mission elapsed time ("MET"), coordinated universal time ("UTC") and the time at Mission Control Center ("MCC");

wherein said task definition user interface and said user interface element for displaying a mission timeline are generated on at least one particular machine and tangibly displayed on at least one display device, said at least one particular machine comprising at least one physical computing device.

16. The activity scheduling tool in accordance with claim 15, wherein the task definition user interface is adapted to receive from the person an indication of a level of electrical power required for the task.

17. The activity scheduling tool in accordance with claim 15, wherein the task definition user interface is adapted to receive from the person an indication of a level of communications bandwidth required for the task.

18. The activity scheduling tool in accordance with claim 15, wherein the task definition user interface is adapted to receive from the person a task duration associated with the task.

* * * * *